United States Patent
Hrastnik

(10) Patent No.: US 11,341,142 B2
(45) Date of Patent: May 24, 2022

(54) FRAMEWORK AND METADATA ARTEFACTS FOR UPDATING DATA ARTEFACTS

(71) Applicant: SAP SE, Walldorf (DE)

(72) Inventor: Jan Hrastnik, Sandhausen (DE)

(73) Assignee: SAP SE, Walldorf (DE)

( * ) Notice: Subject to any disclaimer, the term of this patent is extended or adjusted under 35 U.S.C. 154(b) by 44 days.

(21) Appl. No.: 16/890,892

(22) Filed: Jun. 2, 2020

(65) Prior Publication Data
US 2021/0374146 A1 Dec. 2, 2021

(51) Int. Cl.
*G06F 16/00* (2019.01)
*G06F 16/2457* (2019.01)
*G06F 16/248* (2019.01)
*G06F 16/27* (2019.01)
*G06F 16/23* (2019.01)

(52) U.S. Cl.
CPC .... *G06F 16/24573* (2019.01); *G06F 16/2343* (2019.01); *G06F 16/2393* (2019.01); *G06F 16/248* (2019.01); *G06F 16/27* (2019.01)

(58) Field of Classification Search
None
See application file for complete search history.

(56) References Cited

U.S. PATENT DOCUMENTS

| | | |
|---|---|---|
| 10,127,365 B2 | 11/2018 | Kauerauf et al. |
| 10,339,040 B2 | 7/2019 | Devpura et al. |
| 2002/0169781 A1* | 11/2002 | Poole .................. G06F 21/6218 |
| 2004/0210607 A1 | 10/2004 | Manchanda et al. |
| 2006/0200438 A1 | 9/2006 | Scholming |
| 2010/0042978 A1 | 2/2010 | Bird et al. |
| 2013/0179474 A1 | 7/2013 | Charlet et al. |
| 2017/0017709 A1 | 1/2017 | Sarferaz |
| 2017/0286456 A1* | 10/2017 | Wenzel ................ G06F 16/212 |
| 2018/0173520 A1* | 6/2018 | Golding ................ G06F 9/542 |
| 2019/0188297 A1 | 6/2019 | Goyal et al. |
| 2019/0197137 A1 | 6/2019 | Braud et al. |

(Continued)

OTHER PUBLICATIONS

Non-Final Office Action received in U.S. Appl. No. 16/387,983, dated Sep. 1, 2021, 12 pages.

(Continued)

*Primary Examiner* — Bai D Vu
(74) *Attorney, Agent, or Firm* — Klarquist Sparkman, LLP

(57) ABSTRACT

Techniques and solutions are described for defining metadata artefacts and, using a framework, which can be referred to as a decorator framework, updating data artefacts. The data artefacts can be artefacts in a virtual data model, such as data artefacts representing views that can correspond to a view, or one or more tables, of a relational database system. A metadata artefact can include semantic elements, such as annotations, that are processable by the decorator framework in updating data artefacts. Annotations can specify an operation type, such as to include, remove, replace, or synchronize, for content a metadata artefact, where the operation will be carried out on data artefacts to which the metadata artefact is applied and which contain specified content. Multiple metadata artefacts can be applied to a given data artefact, and a given metadata artefact can be applied to multiple data artefacts.

21 Claims, 30 Drawing Sheets

(56) References Cited

U.S. PATENT DOCUMENTS

2020/0334272 A1  10/2020  Hrastnik et al.

OTHER PUBLICATIONS

U.S. Appl. No. 16/387,983, filed Apr. 18, 2019, Hrastnik et al.
ABAP CDS—cast_exp, https://help.sap.com/doc/abapdocu_751_index_htm/7.51/en-US/abencds_f1_cast_expression.htm, at least as early as Jun. 2, 2020, 4 pages.
CDS Annotations, SAP CDS, https://www.abaponhana.com/cds-annotations/, at least as early as Jun. 2, 2020, 8 pages.
Keller, "ABAP News for Release 7.51—ABAP CDS Client Handling," SAP, https://blogs.sap.com/2016/10/28/abap-news-release-7.51-abap-cds-client-handling/, Oct. 28, 2016, 7 pages.
CDS Part 15. Associations in CDS Views—1, https://sapyard.com/cds-part-15-associations-in-cds-views-i/, Feb. 21, 2019, 21 pages.
Compounding in CDS, https://wiki.scn.sap.com/wiki/display/BI/Compounding+in+CDS, a version of which was accessed at least as early as Jun. 2, 2020, Aug. 5, 2020, 3 pages.
Technical Overview of CDS View for ABAPPer—Part II, https://www2.slideshare.net/AshishSaxena15/technical-overview-of-cds-view-for-abaper-part-ii, at least as early as Jun. 2, 2020, 4 pages.
Core Data Services for ABAP, https://s3-eu-west-1.amazonaws.com/gxmedia.galileo-press.de/leseproben/4822/reading_sample_sappress_1798_coredataservicesforabap.pdf, chapter 6, May 29, 2019, 33 pages.
Notice of Allowance received in U.S. Appl. No. 16/387,983, filed Jan. 5, 2022, 10 pages.

\* cited by examiner

```
@AbapCatalog.sqlViewName: 'ISAMPLESO'
@EndUserText.label: 'Sample Sales Order'
@ObjectModel.compositionRoot: true
@ObjectModel.representativeKey: 'SalesOrder'
@Analytics.dataCategory: #DIMENSION
@AccessControl.authorizationCheck: #CHECK
@Metadata.allowExtensions: true
@Search.searchable: true
define view I_SampleSalesOrder
  as select from   vbak
    left outer to one join vbkd on  vbak.vbeln = vbkd.vbeln
                                and vbkd.posnr = '000000' association [0..*] to I_SampleSalesOrderItem as _Item
    on $projection.SalesOrder = _Item.SalesOrder
  association [0..1] to I_SampleCurrency as _TransactionCurrency
    on $projection.TransactionCurrency = _TransactionCurrency.Currency
  association [0..1] to I_SampleCustomer     as _SoldToParty
    on $projection.SoldToParty = _SoldToParty.Customer
{
    @Search.defaultSearchElement: true
key cast(vbak.vbeln as vdm_sales_order_preserving_type) as SalesOrder,
    @ObjectModel.association.type: [#TO_COMPOSITION_CHILD]   //Composition
    _Item,
    vbak.vkorg                                       as SalesOrganization,
    vbak.auart                                       as SalesOrderType,
    vbak.vtweg                                       as DistributionChannel,
    @ObjectModel.foreignKey.association: '_SoldToParty'
    vbak.kunnr                                       as SoldToParty,
    _SoldToParty,
    @DefaultAggregation: #SUM
    @Semantics.amount.currencyCode: 'TransactionCurrency'
    vbak.netwr                                       as TotalNetAmount,
    @Semantics.currencyCode: true
    @ObjectModel.foreignKey.association: '_TransactionCurrency'
    vbak.waerk                                       as TransactionCurrency,
    _TransactionCurrency,
    ...
}
where vbak.vbtyp = 'C';
```

FIG. 5

```
@AbapCatalog.sqlViewName: 'ISAMPLESO'
@EndUserText.label: 'Sample Sales Order'
@ObjectModel.compositionRoot: true
@ObjectModel.representativeKey: 'SalesOrder'         604
@Analytics.dataCategory: #DIMENSION
@AccessControl.authorizationCheck: #CHECK
@Metadata.allowExtensions: true
@Search.searchable: true
define view I_SampleSalesOrder
    as select from      vbak
       left outer to one join vbkd on  vbak.vbeln = vbkd.vbeln
                                   and vbkd.posnr = '000000'
    association [0..*] to I_SampleSalesOrderItem as _Item
      on $projection.SalesOrder = _Item.SalesOrder
    association [0..1] to I_SampleCurrency as _TransactionCurrency
      on $projection.TransactionCurrency = _TransactionCurrency.Currency
    association [0..1] to I_SampleCustomer          as _SoldToParty
      on $projection.SoldToParty = _SoldToParty.Customer
{
    @Search.defaultSearchElement: true
    key cast(vbak.vbeln as vdm_sales_order_preserving_type) as SalesOrder,
    @ObjectModel.association.type: [#TO_COMPOSITION_CHILD]    //Composition
    _Item,
    vbak.vkorg                                  as SalesOrganization,
    vbak.auart                                  as SalesOrderType,
    vbak.vtweg                                  as DistributionChannel,
    @ObjectModel.foreignKey.association: '_SoldToParty'
    vbak.kunnr                                  as SoldToParty,
    _SoldToParty,
    @DefaultAggregation: #SUM
    @Semantics.amount.currencyCode: 'TransactionCurrency'
    vbak.netwr                                  as TotalNetAmount,
    @Semantics.currencyCode: true
    @ObjectModel.foreignKey.association: '_TransactionCurrency'
    vbak.waerk                                  as TransactionCurrency,
    _TransactionCurrency,
    ...
}
where vbak.vbtyp = 'C';
```

608 →
```
@EndUserText.label: 'Auto assigned role for I_SampleSalesOrder'
@MappingRole: true
define role I_SampleSalesOrder {
    grant select on I_SampleSalesOrder
    where ( SalesOrderType ) =
    aspect pfcg_auth ( v_vbak_aat,
                       auart,
                       actvt = '03' );
}
```

612 →
```
@Metadata.layer: #CORE
annotate view I_SampleSalesOrder
with
{
    @UI.lineItem: [{importance: #HIGH }]
    SalesOrder;
    @UI.lineItem: [{importance: #HIGH }]
    SalesOrderType;
}
```

616 →
```
@AbapCatalog.sqlViewAppendName: 'XINSAMPLEISO'
@EndUserText.label: 'Sales Order Extension India'
extend view I_SampleSalesOrder with X_IN_I_SampleSalesorder
{
    _SoldToParty.CustomerClassification
}
```

FIG. 6

```
704
  @Scope: [#ELEMENT, #PARAMETER, #ENTITY]
  @CompatibilityContract: {                           700
     c1: { usageAllowed: true,           706
           allowedChanges.annotation: [ #ANY ],
           allowedChanges.value: [ #ANY ] },
     c2: { usageAllowed: true,
           allowedChanges.annotation: [ #ANY ],
           allowedChanges.value: [ #ANY ] }
  } 710
  define annotation MetadataDecorator {
    @Scope: [#ENTITY, #ROLE]              718
    includedModel: array of String(30);
714 @Scope: [#ENTITY, #ROLE]
    name {                       714
       map : array of {
          array of {
722          local : String(30);
             alias : String(30);
          };
       };
    };     726
    option: String(30) enum {
       INCLUDE;
       EXCLUDE;
       REPLACE;
       SYNCHRONIZE;
    };                     730
714 replacementDefinition: String(30);
    scope: String(30) enum {
       ANNOTATION;
       DATA_TYPE;
       ELEMENT;
    };               714
    @Scope: [#ENTITY, #ROLE]      734
    usedModel: array of String(30);
  };
```

FIG. 7

```
                820┐      ┌824   ┌808
                              ┌828
    define view CMD_Currency
       as select from CMD_DUMMY_TABLE
    {   ┌832              ┌836
       @MetadataDecorator:[{scope:#ANNOTATION,
                            option:#INCLUDE}]
   ┌─ @Semantics.currencyCode:true        ─838
   │   cast( '' as abap.cuky(5) ) as TransactionCurrency
  816 }     └─844

┌854
    define view SampleView        ┌812
    ...
    {
       ...
       @EndUserText.label: 'Transaction Currency'
    ┌─TransactionCurrency,
  856 CompanyCodeCurrency,
       ...
    }

┌860
                ┌870
    @MetadataDecorator.usedModel:['CMD_Currency']
    define view SampleView
    ...
    {
       ...
       @EndUserText.label: 'Transaction Currency'
       @Semantics.currencyCode:true
       TransactionCurrency,     └816
       CompanyCodeCurrency,
       ...
    }

┌874 define view CMD_Currency_2
       as select from CMD_DUMMY_TABLE
    {
       @MetadataDecorator:[{scope:#ANNOTATION,
   876                      option:#INCLUDE}]
       @Semantics.currencyCode:true
       cast( '' as abap.cuky(5) ) as CompanyCodeCurrency
    }
```

FIG. 8A

```
                                              ┌─ 878
define view CMD_Currency
  as select from CMD_DUMMY_TABLE
{
  @MetadataDecorator:[{scope:#ANNOTATION,
                       option:#INCLUDE}]
  @Semantics.currencyCode:true
  cast( '' as abap.cuky(5) ) as TransactionCurrency,
  @MetadataDecorator:[{scope:#ANNOTATION,
                       option:#INCLUDE}]
  @Semantics.currencyCode:true
  cast( '' as abap.cuky(5) ) as CompanyCodeCurrency
```

FIG. 8B

```
                                              ┌─ 910
        914─╮          916─╮
@MetadataDecorator.name.map:[[{local:'TransactionCurrency',  918
                       916    alias:'CompanyCodeCurrency'}];
                          ─[{local:'TransactionCurrency',
                             alias:'DisplayCurrency'}]]
define view CMD_Currency                           ─918
  as select from CMD_DUMMY_TABLE
{
  @MetadataDecorator:[{scope:#ANNOTATION,
                       option:#INCLUDE}]
  @Semantics.currencyCode:true
  cast( '' as abap.cuky(5) ) as TransactionCurrency
}

┌─ 920
@MetadataDecorator.usedModel:['CMD_Currency']
define view SampleView
...
{
  ...
  @EndUserText.label: 'Transaction Currency'
  @Semantics.currencyCode:true
  TransactionCurrency,
  @Semantics.currencyCode:true
  CompanyCodeCurrency,
  ...
}
```

FIG. 9

```
                                                    ┌─1004
define view CMD_Currency_3
  as select from CMD_DUMMY_TABLE
{                              ┌─1018
    @MetadataDecorator:[{scope:#ANNOTATION,1020
                         option:#EXCLUDE},
     1016                   {scope:#DATA_TYPE,─1032
1024              1026  option:#INCLUDE}]
    @EndUserText.label:#('ANY')         1034
    cast( '' as DATA_ELEM_TRANSACTION_CURRENCY ) as TransactionCurrency
}         1036
```

```
                                         ┌─1040
@MetadataDecorator.usedModel:['CMD_Currency',
                              'CMD_Currency_3']
define view SampleView
...
{
   ...                        ┌─1042
   @Semantics.currencyCode:true
   cast( TransactionCurrency as DATA_ELEM_TRANSACTION_CURRENCY
    preserving type) as TransactionCurrency,
1044 @Semantics.currencyCode:true
   CompanyCodeCurrency,
   ...
}
```

```
                       ┌─1008
   define view SampleView
   ...
   {                    ┌─1012
      ...
      @EndUserText.label: 'Transaction Currency'
     TransactionCurrency,
       CompanyCodeCurrency,
1010  ...
   }
```

FIG. 10A

```
define view CMD_Currency_4                        ←1050
  as select from CMD_DUMMY_TABLE
{
  @MetadataDecorator:[{scope:#ANNOTATION, 1060
        1054 ⌐            option:#INCLUDE},
                          {scope:#DATA_TYPE,
1058 ⌐                    option:#INCLUDE}]
  @EndUserText.label:null                    1062
  cast( '' as DATA_ELEM_TRANSACTION_CURRENCY ) as TransactionCurrency
}

←1070
@MetadataDecorator.usedModel:['CMD_Currency',
                              'CMD_Currency_4']
define view SampleView
...
{
  ...
  @EndUserText.label:null
  @Semantics.currencyCode:true
  cast( TransactionCurrency as DATA_ELEM_TRANSACTION_CURRENCY
     preserving type ) as TransactionCurrency,
  @Semantics.currencyCode:true
  CompanyCodeCurrency,
  ...
}
```

FIG. 10B

```
                          ┌─1108                    ┌─1104
             define view CMD_KeyDate
               with parameters                       ┌─1116
                 @MetadataDecorator:[{scope:#ANNOTATION,
                1112─┘          1120  option:#INCLUDE},
             1126                    {scope:#DATA_TYPE, 1118
                                         option:#INCLUDE}]
                 @Environment.systemField:#SYSTEM_DATE  1122
                 P_KeyDate : DATA_ELEM_KEY_DATE
               as select from CMD_DUMMY_TABLE    1130
             {
               *
             }
```

FIG. 11

```
                                                      ┌─1204
                   1208             1212
                     @MetadataDecorator:[{scope:#ANNOTATION, 1214
              1220                       option:#INCLUDE}]
                   @AbapCatalog.compiler.compareFilter: true
                   @AbapCatalog.preserveKey: true
              1222 @ClientHandling.algorithm: #SESSION_VARIABLE
                   define view CMD_ViewAnnotation      1224
                     as select from CMD_DUMMY_TABLE
                   {
                     *
                   }
```

FIG. 12

```
1320                                    ┌─1304
  define view CMD_FixDomainValue
    as select from dd071
  {                └─1324         ┌─1312
     @MetadataDecorator:[{scope:#ANNOTATION,
1308─┘                    option:#INCLUDE},
                        {scope:#ELEMENT,
           1330─┐         option:#INCLUDE}] 1310
     @Consumption.hidden:true
     dd071.domvalue_1 as DomainValue
  }         └─1322         └─1326
```

FIG. 13

```
                              ┌─1404
  define view CMD_CustomerName
    as select from I_Customer
  {
     @MetadataDecorator:[{scope:#ELEMENT,
   1412─┘              option:#INCLUDE}]    ┌─1408
     cast(substring(rtrim(replace(concat(OrganizationBPName1,
        concat(' &@',   OrganizationBPName2)), '&@', ''),' '),1,80)
        as md_customer_name) as CustomerName
  }
```

FIG. 14

```
                                          ┌─1504
                   1530─┐
  @MetadataDecorator.name.map:[[{local:'name1',
                                 alias:'OrganizationBPName1'},
                                {local:'name2',
           ┌─1508                alias:'OrganizationBPName2'}
                                ]]
  define view I_Customer
    ...
  {          ┌─1516    ┌─1520
    ...                        ┌─1522
    @MetadataDecorator:[{scope:#ELEMENT,
                        option:#INCLUDE}]        ┌─1512
    cast(substring(rtrim(replace(concat(name1,
       concat(' &@', name2)), '&@', ''),' '),1,80) as md_customer_name)
       as CustomerName,
    ...
  }
```

FIG. 15

```
define view CMD_Product
    as select from CMD_DUMMY_TABLE
    association [0..1] to I_Product as _Product          1604
    on $projection.Product = _Product.Product
{                  1614
    @MetadataDecorator:[{scope:#ANNOTATION,
                        option:#INCLUDE}]
    @ObjectModel.foreignKey.association:'_Product'
1622 '' as Product,
    @MetadataDecorator:[{scope:#ELEMENT,
              1618    option:#INCLUDE}]
    _Product
}        1620
```

1630 points to the association lines. 1614, 1622, 1618, 1620 as labeled.

FIG. 16

```
@MetadataDecorator.name.map:[[{local:'CostCenter',
          1708            alias:'SenderCostCenter'},      1704
                         {local:'_CostCenter',
                          alias:'_SenderCostCenter'},
                         {local:'ControllingArea',
                          alias:'SenderControllingArea'},
                         {local:'_ControllingArea',
                          alias:'_SenderControllingArea'}],
                        [{local:'CostCenter',
                          alias:'ReceiverCostCenter'},
                         {local:'_CostCenter',
                          alias:'_ReceiverCostCenter'},
                         {local:'ControllingArea',
                          alias:'ReceiverControllingArea'},
                         {local:'_ControllingArea',
                          alias:'_ReceiverControllingArea'}]]
define view CMD_Costcenter
    as select from CMD_DUMMY_TABLE
    association [0..1] to I_ControllingArea as _ControllingArea
        on $projection.ControllingArea = _ControllingArea.ControllingArea
    association [0..*] to I_CostCenter as _CostCenter
        on  $projection.CostCenter    = _CostCenter.CostCenter
        and $projection.ControllingArea = _CostCenter.ControllingArea
{
    @MetadataDecorator:[{scope:#ANNOTATION,
         1712            option:#INCLUDE},
                        {scope:#DATA_TYPE,
                         option:#INCLUDE}]           1730
    @ObjectModel.foreignKey.association: '_ControllingArea'
    cast( '' as kokrs ) as ControllingArea,
    @MetadataDecorator:[{scope:#ANNOTATION,  1736
         1716            option:#INCLUDE},
                        {scope:#DATA_TYPE,
                         option:#INCLUDE}]
    @ObjectModel.foreignKey.association: '_CostCenter'
    cast( '' as kostl ) as CostCenter,          1732
    @MetadataDecorator:[{scope:#ELEMENT,
1738       1720         option:#INCLUDE}]
    _ControllingArea,
    @MetadataDecorator:[{scope:#ELEMENT,
                1724    option:#INCLUDE}]
    _CostCenter
}
```

FIG. 17A

```
define view SampleView_2    1740
...
{
   ...
   SenderCostCenter,
   SenderControllingArea,
   ...
}

@MetadataDecorator.usedModel:['CMD_Costcenter']    1750
define view SampleView_2
...
   association [0..1] to I_ControllingArea as _SenderControllingArea
     on $projection.SenderControllingArea
        = _SenderControllingArea.ControllingArea
   association [0..*] to I_CostCenter as _SenderCostCenter
     on  $projection.SenderCostCenter = _SenderCostCenter.CostCenter
     and $projection.SenderControllingArea
        = _SenderCostCenter.ControllingArea
{
   ...
   @ObjectModel.foreignKey.association: '_SenderCostCenter'
   cast( SenderCostCenter as kostl ) as SenderCostCenter,
   _SenderCostCenter,
   @ObjectModel.foreignKey.association: '_SenderControllingArea'
   cast( SenderControllingArea as kokrs ) as SenderControllingArea,
   _SenderControllingArea,
   ...
}
```

FIG. 17B

```
define view SampleView_3                    1804
...
{
  ...                  1808
  @DefaultAggregation:#SUM
  TotalNetAmount,
  ...         1810
} define view CMD_ReplaceDefaultAggregation        1812
  as select from CMD_DUMMY_TABLE
{                                     1820
  @MetadataDecorator:[{scope:#ANNOTATION,
     1816               option:#REPLACE,
                  1822   replacementDefinition:'NewTotalNetAmount'}]
  @DefaultAggregation:#SUM               1826
1808 '' as TotalNetAmount,
  @Aggregation.default:#SUM
  '' as NewTotalNetAmount   1830
}          1834

1850
@MetadataDecorator.usedModel:['CMD_ReplaceDefaultAggregation']
define view SampleView_3
...
{          1830
  ...
  @Aggregation.default:#SUM
  TotalNetAmount,
  ...        1810
}

1864
@MetadataDecorator.name.map:[[{local:'TotalNetAmount',
                               alias:#('ANY')}]]     1860
define view CMD_ReplaceDefaultAggregation2
  as select from CMD_DUMMY_TABLE
{
  @MetadataDecorator:[{scope:#ANNOTATION,
      1868              option:#REPLACE,
                        replacement:'NewTotalNetAmount'}]
  @DefaultAggregation:#('ANY')
  '' as TotalNetAmount,
  @Aggregation.default:#('VALUE_OF:DefaultAggregation')
  '' as NewTotalNetAmount         1872
}
```

FIG. 18

```
define view SampleView_4                   1904
...
{        1908
   ...
   @EndUserText.label:'Product'
   Product,
   ...      1906
}
```

```
define view CMD_Product                              1920
   as select from CMD_DUMMY_TABLE
{                                    1924
   @MetadataDecorator:[{scope:#ANNOTATION,   1926
        1922            option:#SYNCHRONIZE}]
   @Consumption.valueHelpDefinition:[{entity:{name:'I_ProductStdVH',
                        1930                  element:'Product'}}]
   '' as Product
}           1950
```

```
@MetadataDecorator.usedModel:['CMD_Product']    1940
define view SampleView_4
...
{
   ...
   @Consumption.valueHelpDefinition:[{entity:{name:'I_ProductStdVH',
                        1930                  element:'Product'}}]
   Product,
   ...   1906
}
```

FIG. 19

Select DDLS_NAME
from DDLS_PERSISTENCY...
where NOT (
    APPLICATION_COMPONENT = 'XXX-YYY-ZZZ'
    AND
    RELEASE_STATUS = 'RELEASED'
)
AND (
    DDLS_NAME like 'C_%'
)

2880

| Selection ID | Condition | Criterion | Sign | Option | Value Low | Value High |
|---|---|---|---|---|---|---|
| | | | | | | |
| 4712 | 1 | DDLS_NAME | Including | Equal | C_DDLS1 | |
| 4712 | 2 | DDLS_NAME | Including | Equal | C_DDLS2 | |
| 4712 | 3 | DDLS_NAME | Including | Equal | C_DDLS3 | |

FRAMEWORK AND METADATA ARTEFACTS FOR UPDATING DATA ARTEFACTS

FIELD

The present disclosure generally relates to computer-implemented artefacts, such as data artefacts and metadata artefacts. Particular implementations provide a framework that allows data artefacts to be updated using metadata artefacts.

BACKGROUND

Database systems can be very complex, particularly for enterprise resource planning (ERP) systems. A database for an ERP system often includes thousands of tables. Each table can have many fields.

It is common for developers to work indirectly with database tables. While database systems often focus on efficiently storing, retrieving, and modifying information, it can be complicated to interact directly with the database, in part because of technical issues in accessing the database, such as through a query language (e.g., SQL), and in part because database systems typically lack significant semantic information for the relations and attributes included in the database system.

To help address these issues, it is common for developers to create applications that interact indirectly with the database. While the database can include a data dictionary or information schema that stores a data model that includes information about relations in the database, a virtual data model can be used to interface with the database. Artefacts in the virtual data model can specify entities (such as relations or views) from which they may obtain data, and can also specify operations to be carried out using data from a specified entity (e.g., calculations, which in some cases can be pushed down to the database, which may be able to perform the operations more efficiently than at the level of a framework or application outside of the database) and sematic information.

Semantic information can include associations with other virtual data model artefacts, annotations that can be used to drive application functionality without having to specifically program the application to include such functionality, and information that describes components of a particular virtual data model artefact. In particular, annotations can be beneficial, because functionality can be defined in a more human-readable format, rather than requiring programming in a more traditional programming language. Development can be facilitated, as a developer can accomplish many tasks by being familiar with a single notation used for defining the virtual data mode, rather than having to be familiar with the details of multiple applications and possibly multiple programming languages.

Although virtual data models can provide many advantages, they can have some drawbacks. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for defining metadata artefacts and, using a framework, which can be referred to as a decorator framework, updating data artefacts. The data artefacts can be artefacts in a virtual data model, such as data artefacts representing views that can correspond to a view, or one or more tables, of a relational database system. A metadata artefact can include semantic elements, such as annotations, that are processable by the decorator framework in updating data artefacts. Annotations can specify an operation type, such as to include, remove, replace, or synchronize, for content a metadata artefact, where the operation will be carried out on data artefacts to which the metadata artefact is applied and which contain specified content. Multiple metadata artefacts can be applied to a given data artefact, and a given metadata artefact can be applied to multiple data artefacts.

In one aspect, the present disclosure provides a method for updating one or more data artefacts using one or more metadata artefacts. A command is received by a metadata decorator framework to update one or more data artefacts with one or more metadata artefacts. A given metadata artefact of the one or more metadata artefacts includes one or more syntax elements processable by the metadata decorator framework. The one or more data artefacts are retrieved. The one or more metadata artefacts are retrieved. The one or more data artefacts are updated according to one or more metadata indicators specified by the one or more metadata artefacts to provide one or more updated data artefacts. A metadata indicator includes at least a portion of the one or more syntax elements. The one or more updated data artefacts are stored.

The present disclosure also includes computing systems and tangible, non-transitory computer readable storage media configured to carry out, or including instructions for carrying out, an above-described method (or operations). As described herein, a variety of other features and advantages can be incorporated into the technologies as desired.

BRIEF DESCRIPTION OF THE DRAWINGS

FIG. 5 is code for an example metadata model for a database view.

FIG. 6 is code for an example metadata model for a database view, and for metadata models which modify or refer to such example metadata model.

FIG. 7 is code illustrating example components that can be included in a metadata artefact.

FIGS. 8A and 8B are code illustrating how annotations can be added to data artefacts using metadata artefacts.

FIG. 9 is code illustrating how a mapping command can be used to map local names in a metadata artefact to aliases in other artefacts.

FIGS. 10A and 10B are code illustrating how annotations can be removed from data artefacts using metadata artefacts.

FIG. 11 is code illustrating how a metadata artefact can be used to add annotations to parameters in a data artefact.

FIG. 12 is code illustrating how a metadata artefact can be used to add annotations to a definition of a data artefact.

FIGS. 13-15 are code illustrating how fields can be added to a data artefact using a metadata artefact.

FIGS. 16 and 17A and 17B are code illustrating how associations can be added to data artefacts using metadata artefacts.

FIG. 18 is code illustrating how components of a data artefact can be replaced using metadata artefacts.

FIG. 19 is code illustrating how components of a data artefact can be synchronized with a metadata artefact.

FIGS. 28A and 28B illustrate a persistency model for artefact selection criteria.

DETAILED DESCRIPTION

Example 1—Overview

Figure 1:
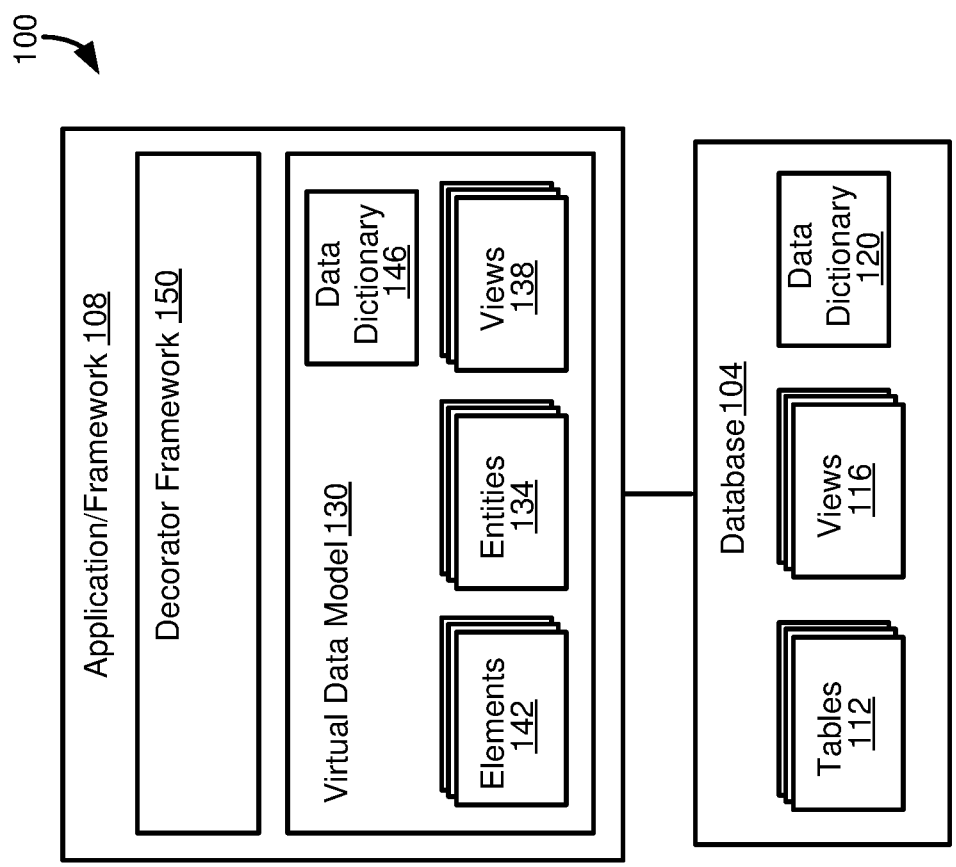
FIG. 1 is a diagram illustrating an example computing environment having a decorator framework in which disclosed embodiments can be implemented.

Database systems can be very complex, particularly for enterprise resource planning (ERP) systems. A database for an ERP system often includes thousands of tables. Each table can have many fields.

It is common for developers to work indirectly with database tables. While database systems often focus on efficiently storing, retrieving, and modifying information, it can be complicated to interact directly with the database, in part because of technical issues in accessing the database, such as through a query language (e.g., SQL), and in part because database systems typically lack significant semantic information for the relations and attributes included in the database system.

To help address these issues, it is common for developers to create applications that interact indirectly with the database. While the database can include a data dictionary or information schema that stores a data model that includes information about relations in the database, a virtual data model can be used to interface with the database. Artefacts in the virtual data model can specify entities (such as relations or views) from which they may obtain data, and can also specify operations to be carried out using data from a specified entity (e.g., calculations, which in some cases can be pushed down to the database, which may be able to perform the operations more efficiently than at the level of a framework or application outside of the database) and sematic information.

Semantic information can include associations with other virtual data model artefacts, annotations that can be used to drive application functionality without having to specifically program the application to include such functionality, and information that describes components of a particular virtual data model artefact. In particular, annotations can be beneficial, because functionality can be defined in a more human-readable format, rather than requiring programming in a more traditional programming language. Development can be facilitated, as a developer can accomplish many tasks by being familiar with a single notation used for defining the virtual data model, rather than having to be familiar with the details of multiple applications and possibly multiple programming languages.

Although virtual data models can provide many advantages, they can have some drawbacks. For example, an element of a data dictionary, which can correspond to a semantically enriched representation of a database field, may be used in many different artefacts of a virtual data model. If a representation of the element, or metadata describing the element, such as how it can be used, changes, it can be challenging to ensure that all artefacts that use that element are correspondingly updated. Similarly, artefacts of a virtual data model can be reused in multiple other data artefacts. It may be desirable to harmonize the various uses of a given data artefact, but, as with elements, it can be difficult to accomplish this in practice. Accordingly, room for improvement exists.

The present disclosure provides techniques for defining artefacts of a virtual data model that can be used to modify other artefacts in the virtual data model. For example, a virtual data model artefact can be defined to include particular types of components, such as metadata, where the metadata can describe another component of the artefact or define how the artefact or component should be used or processed. This virtual data model artefact can then be used to modify other virtual data model artefacts, such as to add, remove, or modify components in such other artefacts.

The disclosed technologies thus provide for metadata decoration of objects in a virtual data model. In a particular implementation, disclosed technologies can be applied to software available from SAP SE, of Walldorf, Germany SAP provides a virtual data model implemented by CDS (Core Data Services). Data artefacts in CDS can be written in Core Schema Notation (CSN), which is similar to a JavaScript Object Notation (JSON) schema. For ease of presentation, disclosed technologies are sometimes described in the specific embodiment of CDS technologies. However, it should be appreciated that the disclosed techniques can be used with other types of virtual data models, and can be used with schemas that are not part of a virtual data model.

In a particular implementation, data artefacts called CMD (CDS metadata decorator) artefacts can be used to modify other artefacts of the virtual data model, such as CDS views. A metadata decorator framework can implement operations for creating, modifying, and using CMD artefacts, including applying CMD artefacts to other CDS artefacts. More generally, CMD artefacts can be referred to as metadata decorator artefacts, and CDS artefacts can be referred to as data artefacts, which can be virtual data model (VDM) artefacts. As will be explained, CDS views can also be modified (e.g., using a metadata indicator, such as an annotation, that is to be read by the metadata decorator framework) so they can act as CMD artefacts.

Example 2—Example Computing Environment Having Decorator Framework

FIG. 1 illustrates an example computing environment 100 in which disclosed technologies can be implemented. At a high level, the computing environment 100 includes a database system 104 that can communicate with an application or framework layer 108. The database system 104 includes data that can be used by the application/framework layer 108, or applications that communicates with the application/framework layer. The data can be stored in one or more tables 112 of the database 108. The data can be referenced by one or more views 116, which can be view definitions or materialized views (which can then also correspond to tables 112). A data dictionary 120 can store information regarding the tables 112 and the views 116.

The application/framework layer 108 includes a virtual data model 130. The virtual data model 130 can include entities 134 and views 138, which can at least generally correspond to the tables 112 and the views 116 of the database 108. However, as will be described, as compared with the tables 112 and views 116, artefacts in the virtual data model 130 are typically associated with additional information, such as semantic information or information that can be used to manipulate data in one or more artefacts of the database 108 that corresponds to a given artefact in the virtual data model. The virtual data model 130 can include information regarding elements 142, which can correspond to attributes or fields used in the entities 134 and views 138. At least some of the elements 142 can correspond to fields used in the database 104, but are enriched with additional information. Information regarding the entities 134, views 138, and elements 142 can be stored in a data dictionary 146 of the virtual data model 130.

The application/framework 108 includes a decorator framework 150 that can be used to implement disclosed technologies. A particular example of components that can be included in the decorator framework 150 is provided in FIG. 21. Generally, the decorator framework 150 can be used to create and manage metadata artefacts, including applying metadata artefacts to data artefacts.

Generally, as used in the present disclosure, a data artefact refers to an artefact in the virtual data model 130 that is intended for direct use by a user or application. A data artefact can include data elements, including those that refer to data stored in the database 104. However, a data artefact can also include metadata elements, which can describe data elements, or how the data artefact can be used or how it may be processed. Data elements and metadata elements can be collectively referred to as components of an artefact.

A metadata artefact refers to an artefact in the virtual data model 130 that is intended to be used to modify other artefacts using the decorator framework 150. In some cases, a title or other identifier can be used to distinguish metadata artefacts and data artefacts. In addition, or alternatively, data artefacts which can be used as metadata artefacts contain tokens or syntax or semantic elements that indicate, such as to the decorator framework, that the artefact is a metadata artefact. Similarly, actions that are to be taken by a decorator framework can be associated with particular tokens or syntax elements in a data artefact or a metadata artefact indicating that the tokens or syntax elements, or related content (e.g., content following the tokens or syntax elements that act as a flag to the decorator framework), are to be processed by the decorator framework. Generally, these tokens or syntax elements can be referred to as metadata indicators. The present disclosure generally describes disclosed technologies as being implemented using metadata indicators in the form of annotations, however, other types of metadata indicators can be used in an analogous manner. In disclosed examples, annotations intended for use by the decorator framework 150 can be prefaced by "@Metadata-Decorator". Syntax elements, such as brackets, braces, or parentheses, can be used to indicate a beginning and end of an annotation for the decorator framework 150.

So, some data artefacts can also be metadata artefacts, but not all data artefacts are metadata artefacts. All metadata artefacts are useable, at least in appropriate circumstances, to modify other artefacts. While the term artefact is generally used in the present disclosure, the terms "object" or "model" can also be used in place of artefact (e.g., metadata models or metadata objects).

Example 3—Example Table Elements Including Semantic Identifiers

Database systems typically include an information repository that stores information regarding a database schema. For instance, PostgreSQL includes an INFORMATION_SCHEMA that includes information regarding tables in a database system, and certain table components, such as attributes (or fields) and their associated datatypes (e.g., varchar, int, float). Other database systems, or query languages, include similar concepts. However, as described above, these types of repositories typically only store technical information regarding database components, not semantic information.

Other database systems, or applications or frameworks that operate using a database layer, may include repositories that store semantic information for data. For instance, SAP SE of Walldorf, Germany, provides the ABAP programming language which can be used in conjunction with database systems. ABAP provides the ability to develop database applications that are agnostic to the nature, including vendor, of the underlying relational database management system. In part, this ability is enabled using a data dictionary. The data dictionary can include at least some information that is similar to information that is maintained in an information schema. However, the data dictionary can include semantic information regarding data, and optionally additional technical information.

In addition, the data dictionary can include textual information regarding fields in a table, such as human-readable descriptions (sometimes in different languages, such as English, French, or German) of the purpose or use of the field. In at least some cases, the textual information can serve as semantic information to a computer. However, other types of semantic information need not necessarily be (at least easily) human-understandable, but can be easier for a computer to process than parsing textual information primary intended for human use. Data dictionaries can also contain or express relations between data dictionary objects through various properties (which can be reflected in metadata), such as having the data dictionary reflect that dictionary objects are assigned to packages, and thus having a relationship to one another through a package assignment.

As used herein, "technical information" (or technical metadata) relates to information that describes data as data, which is information such as a type that can be used to interpret a value of the data, and which can influence how the data is processed. For instance, the value "6453" could be interpreted (or cast) as an integer, a float, a string, or an array of characters, among various possibilities. A value may be processed differently, in some cases, depending on whether it is a number, such as an integer or a float, or whether it is treated as a collection of characters. Similarly, technical information can specify acceptable values for data, such as a length or a number of decimal places that are allowed. The technical information can specify properties of the data without concern regarding what the data represents or "means." Of course, however, a designer of a database system can select particular technical properties for particular data knowing themselves the semantic properties of the data—e.g., "If I intend to have a value representing a person's name, I should use a string or array of characters rather than a float." On the other hand, in at least some cases, data types might be a type that would not be expected by a database administrator or user. For instance, rather than using a person's name to identify data associated with the person, a separate numerical or alphanumerical identifier might be used, which might be counter intuitive based on the "meaning" of the data (e.g., "I do not consider myself to be a number").

As used herein, "semantic information" (or semantic metadata) relates to information that describes the meaning or purpose of data, which meaning or purpose can be to a human or to a computer process. As an example, technical data information may specify that data is obtained having a value in the format "XXX-XX-XXXX," where X is an integer between 0 and 9. That technical information can be used to determine how the data should be processed, or whether a particular value is valid (e.g., "111-11-1111" is, but "1111-11-1111" is not), but does not indicate what the value represents. Semantic information associated with the data can indicate whether the value is a social security number, a telephone number, a routing address, etc.

Semantic information can also describe how data is to be processed or displayed. For instance, "knowing" that data is a telephone number may cause the value to be displayed in one part of a GUI as opposed to another part of a GUI, or may invoke or not invoke particular processing rules depending on if the rule is active for "telephone number." In at least some cases, "semantic information" can include other types of information that can be used to describe data, or how it should be used or processed. In a particular case, data can be associated with one or more of a label, such as a human understandable description of the data (e.g., "telephone number"), documentation, such as a description of what information should be included in a field having the label (e.g., "enter an 11 digit phone number including area code"), or information that can be used in a help screen (e.g., "enter your home phone number here").

Typically, technical information must be provided for data. In the case of a field of a database table, for example, it is typically necessary to provide a name or identifier for a field and a datatype. The name or identifier for a field might, or might not, serve to provide semantic information. That is, a database designer might choose a name of "Employee_Name," "EMPN," or "3152." However, as the name or identifier is used to locate/differentiate the field from another field, in the context of the present disclosure, it is considered to be technical information, rather than semantic information, even if it may readily convey meaning to a human. In at least some implementations, the use of semantic information is optional. For instance, even using the data dictionary, some fields used in database objects (such as tables, but potentially other objects too, where such other objects are typically associated with one or more tables in an underlying relational database system) can be specified without the use of semantic information, while other fields are associated with semantic information.

Figure 2:
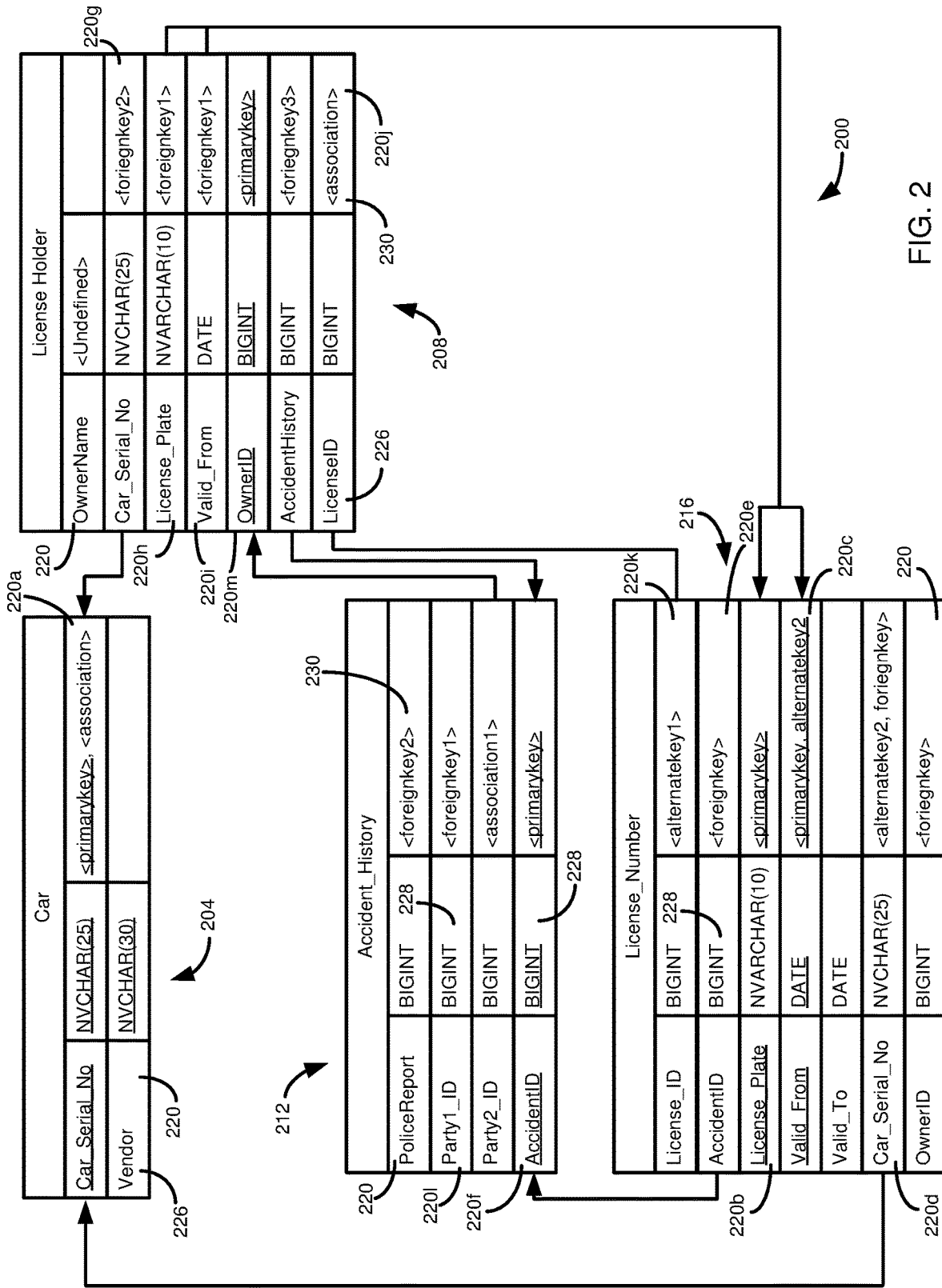
FIG. 2 is a diagram of a database schema showing technical relationships between at least a portion of database tables in the schema.

FIG. 2 is an example entity-relation (ER) type diagram illustrating a data schema 200, or metadata model, related to a driver's accident history. The schema 200 (which can be part of a larger schema, the other components not being shown in FIG. 2) can include a table 208 associated with a license holder (e.g., an individual having a driver's license), a table 212 associated with a license, a table 216 representing an accident history, and a table 204 representing cars (or other vehicles).

Each of the tables 204, 208, 212, 216 has a plurality of attributes 220 (although, a table may only have one attribute in some circumstances). For a particular table 204, 208, 212, 216, one or more of the attributes 220 can serve as a primary key—uniquely identifying particular records in the tuple and being designated as the main method of accessing tuples in the table. For example, in the table 204, the Car_Serial_No attribute 220a serves as the primary key. In the table 216, the combination of attributes 220b and 220c together serve as the primary key.

A table can reference records associated with the primary key of another table through the use of a foreign key. For example, the license number table 216 has an attribute 220d for a Car_Serial_No in table 216 that is a foreign key and is associated with the corresponding attribute 220a of table 204. The use of a foreign key can serve various purposes. The foreign key can link particular tuples in different tables. For example, a foreign key value of 8888 for the attribute 220d would be associated with a particular tuple in table 204 having that value for attribute 220a. Foreign keys can also act as constraints, where a record cannot be created having (or altered to have) a foreign key value that does not exist as a primary key value in the referenced table. Foreign keys can also be used to maintain database consistency, where a change to a primary key value can be propagated to a table where the attribute is a foreign key.

A table can have other attributes, or combinations of attributes, that can serve to uniquely identify tuples, but which are not primary keys. Table 216, for instance, has an alternate key that is formed from attribute 220c and attribute 220d. Thus, a unique tuple can be accessed in the table 216 using either the primary key (e.g., being a foreign key in another table) or through an association to the alternate key.

Schema information is typically maintained in a database layer, such as a software layer associated with where table values are maintained (e.g., in a RDBMS), and typically includes identifiers for the tables 204, 208, 212, 216, and the name 226 and datatype 228 of their associated attributes 220. Schema information may also include at least some of the information conveyable using the flag 230, such as whether a field is associated with a primary key, or indicating a foreign key relationship. However, other relationships, including more informal associations, may not be included in a schema associated with a database layer (e.g., the INFORMATION_SCHEMA of PostgreSQL).

Example 4—Example Table Elements Including Semantic Identifiers

Figure 3:
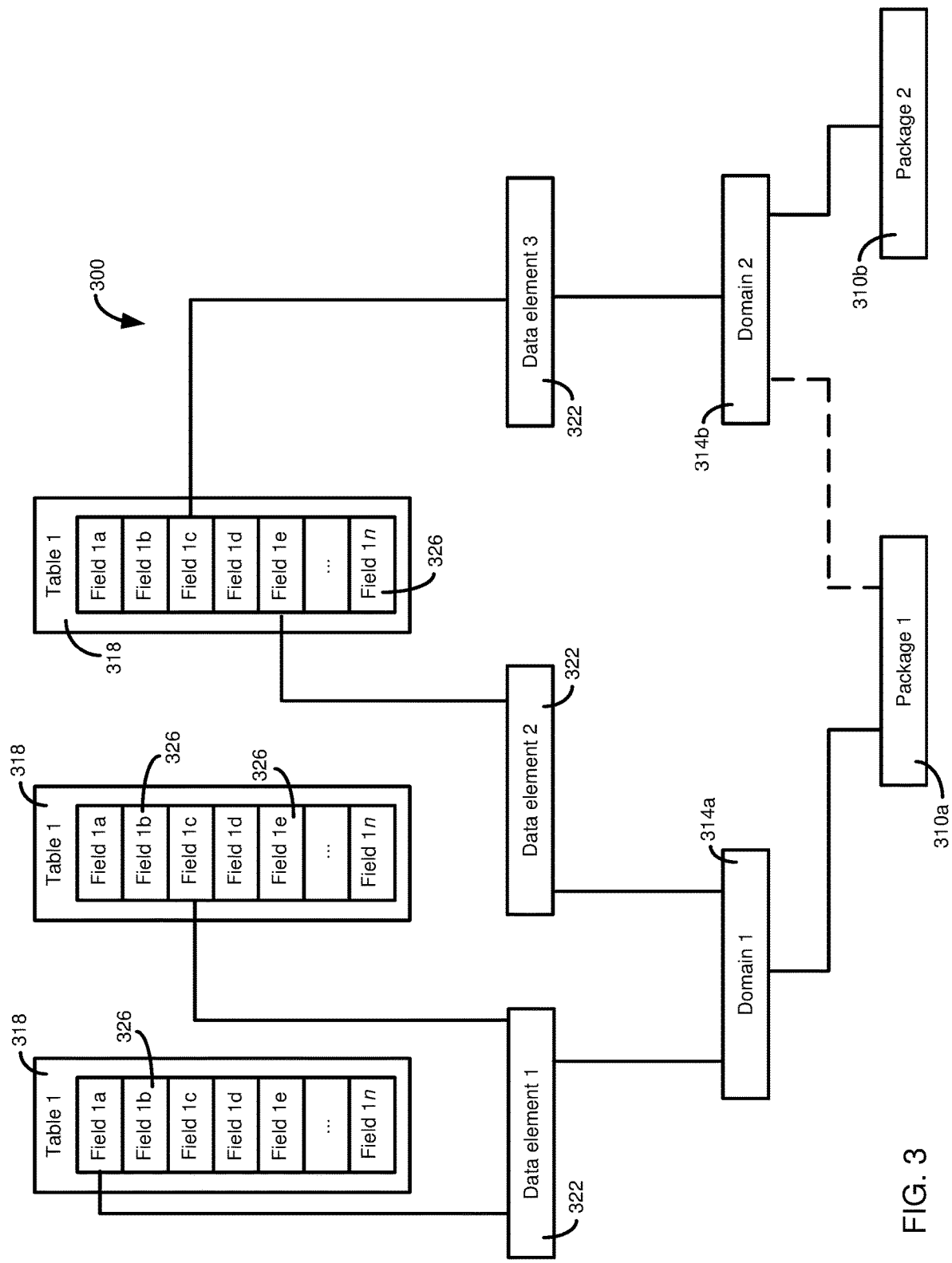
FIG. 3 is a schematic diagram illustrating relationships between table elements that can be included in a data dictionary, or otherwise used to define database tables.

FIG. 3 is a diagram illustrating elements of a database schema 300 and how they can be interrelated. In at least some cases, the database schema 300 can be maintained other than at the database layer of a database system. That is, for example, the database schema 300 can be independent of the underlying database, including a schema used for the underlying database. Typically, the database schema 300 is mapped to a schema of the database layer (e.g., schema 200 of FIG. 2), such that records, or portions thereof (e.g., particular values of particular fields) can be retrieved through the database schema 300.

The database schema 300 can include one or more packages 310. A package 310 can represent an organizational component used to categorize or classify other elements of the schema 300. For example, the package 310 can be replicated or deployed to various database systems. The package 310 can also be used to enforce security restrictions, such as by restricting access of particular users or particular applications to particular schema elements.

A package 310 can be associated with one or more domains 314 (i.e., a particular type of semantic identifier or semantic information). In turn, a domain 314 can be associated with one or more packages 310. For instance, domain 1, 314a, is associated only with package 310a, while domain 2, 314b, is associated with package 310a and package 310b. In at least some cases, a domain 314 can specify which packages 310 may use the domain. For instance, it may be that a domain 314 associated with materials used in a manufacturing process can be used by a process-control application, but not by a human resources application.

In at least some implementations, although multiple packages 310 can access a domain 314 (and database objects that incorporate the domain), a domain (and optionally other database objects, such as tables 318, data elements 322, and fields 326, described in more detail below) is primarily assigned to one package. Assigning a domain 314, and other database objects, to a unique package can help create logical (or semantic) relationships between database objects. In FIG. 3, an assignment of a domain 314 to a package 310 is shown as a solid line, while an access permission is shown as a dashed line. So, domain 314a is assigned to package 310a, and domain 314b is assigned to package 310b. Package 310a can access domain 314b, but package 310b cannot access domain 314a.

Note that at least certain database objects, such as tables 318, can include database objects that are associated with multiple packages. For example, a table 318, Table 1, may be assigned to package A, and have fields that are assigned to package A, package B, and package C. The use of fields assigned to packages A, B, and C in Table 1 creates a semantic relationship between package A and packages B and C, which semantic relationship can be further explained if the fields are associated with particular domains 314 (that is, the domains can provide further semantic context for database objects that are associated with an object of another package, rather than being assigned to a common package).

As will be explained in more detail, a domain 314 can represent the most granular unit from which database tables 318 or other schema elements or objects can be constructed. For instance, a domain 314 may at least be associated with a datatype. Each domain 314 is associated with a unique name or identifier, and is typically associated with a description, such as a human readable textual description (or an identifier than can be correlated with a human readable textual description) providing the semantic meaning of the domain. For instance, one domain 314 can be an integer value representing a phone number, while another domain can be an integer value representing a part number, while yet another integer domain may represent a social security number. The domain 314 thus can help provide common and consistent use (e.g., semantic meaning) across the schema 300. That is, for example, whenever a domain representing a social security number is used, the corresponding fields can be recognized as having this meaning even if the fields or data elements have different identifiers or other characteristics for different tables.

The schema 300 can include one or more data elements 322. Each data element 322 is typically associated with a single domain 314. However, multiple data elements 322 can be associated with a particular domain 314. Although not shown, multiple elements of a table 318 can be associated with the same data element 322, or can be associated with different data elements having the same domain 314. Data elements 322 can serve, among other things, to allow a domain 314 to be customized for a particular table 318. Thus, the data elements 322 can provide additional semantic information for an element of a table 318.

Tables 318 include one or more fields 326, at least a portion of which are mapped to data elements 322. The fields 326 can be mapped to a schema of a database layer, or the tables 318 can be mapped to a database layer in another manner. In any case, in some embodiments, the fields 326 are mapped to a database layer in some manner Or, a database schema can include semantic information equivalent to elements of the schema 300, including the domains 314.

In some embodiments, one or more of the fields 326 are not mapped to a domain 314. For example, the fields 326 can be associated with primitive data components (e.g., primitive datatypes, such as integers, strings, Boolean values, character arrays, etc.), where the primitive data components do not include semantic information. Or, a database system can include one or more tables 318 that do not include any fields 326 that are associated with a domain 314. However, the disclosed technologies can include a schema 300 (which can be separate from, or incorporated into, a database schema) that includes a plurality of tables 318 having at least one field 326 that is associated with a domain 314, directly or through a data element 322.

Example 5—Example Data Dictionary Components

Schema information, such as information associated with the schema 200 of FIG. 2 or the schema 300 of FIG. 3, can be stored in a repository, such as a data dictionary. In at least some cases the data dictionary is independent of, but mapped to, an underlying relational database. Such independence can allow the same database schema 200, 300 to be mapped to different underlying databases (e.g., databases using software from different vendors, or different software versions or products from the same vendor). The data dictionary can be persisted, such as being maintained in stored tables, and can be maintained in memory, either in whole or part. An in-memory version of a data dictionary can be referred to as a dictionary buffer.

Figure 4:
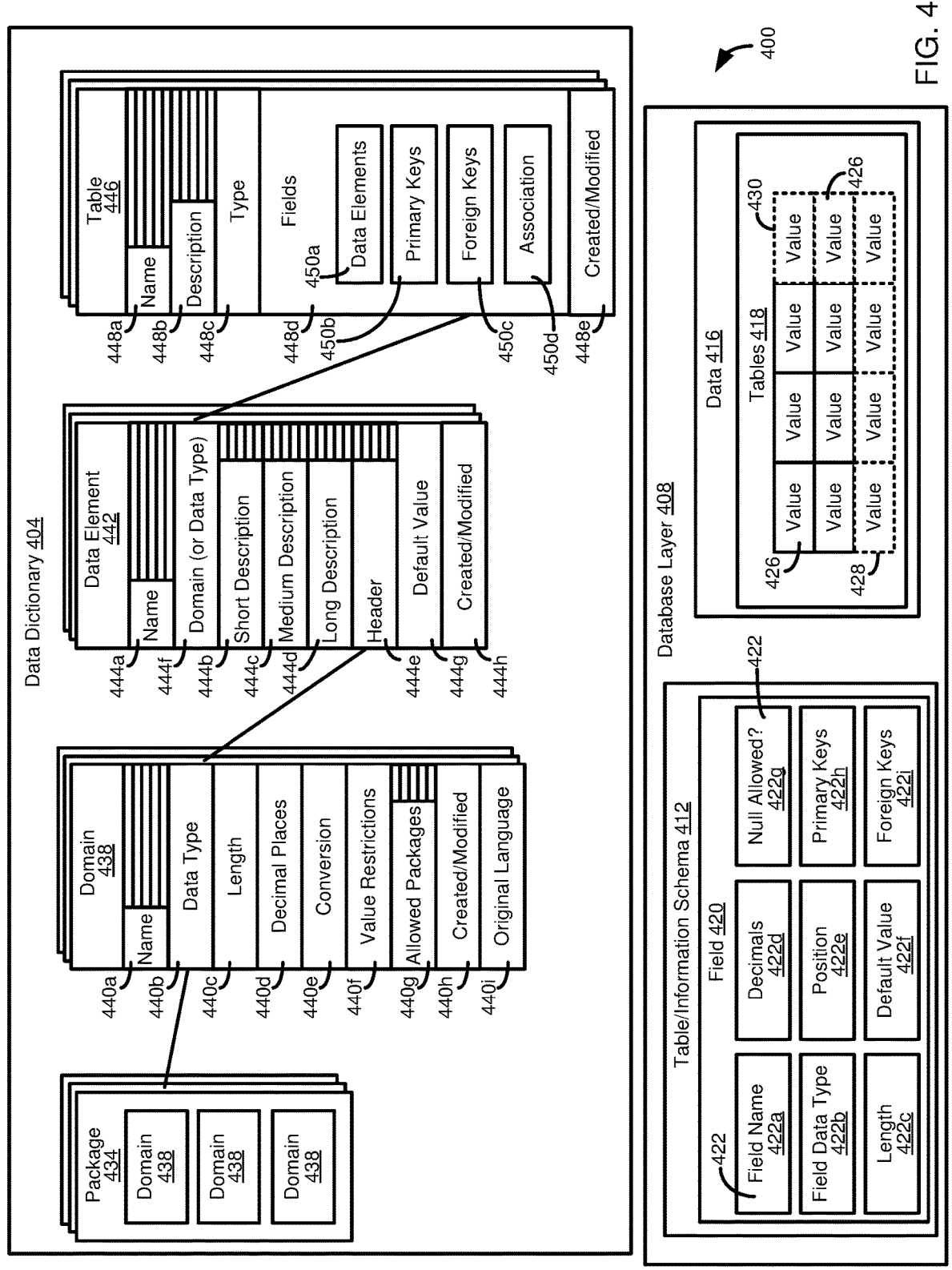
FIG. 4 a schematic diagram illustrating components of a data dictionary and components of a database layer.

FIG. 4 illustrates a database environment 400 having a data dictionary 404 that can access, such as through a mapping, a database layer 408. The database layer 408 can include a schema 412 (e.g., an INFORMATION_SCHEMA as in PostgreSQL) and data 416, such as data associated with tables 418. The schema 412 includes various technical data items/components 422, which can be associated with a field 420, such as a field name 422a (which may or may not correspond to a readily human-understandable description of the purpose of the field, or otherwise explicitly describe the semantic meaning of values for that field), a field data type 422b (e.g., integer, varchar, string, Boolean), a length 422c (e.g., the size of a number, the length of a string, etc., allowed for values in the field), a number of decimal places 422d (optionally, for suitable datatypes, such as, for a float with length 6, specifying whether the values represent XX.XXXX or XXX.XXX), a position 422e (e.g., a position in the table where the field should be displayed, such as being the first displayed field, the second displayed field, etc.), optionally, a default value 422f (e.g., "NULL," "0," or some other value), a NULL flag 422g indicating whether NULL values are allowed for the field, a primary key flag 422h indicating whether the field is, or is used in, a primary key for the table, and a foreign key element 422i, which can indicate whether the field 420 is associated with a primary key of another table, and, optionally, an identifier of the table/field referenced by the foreign key element. A particular schema 412 can include more, fewer, or different technical data items 422 than shown in FIG. 4.

The tables 418 are associated with one or more values 426. The values 426 are typically associated with a field 420 defined using one or more of the technical data elements 422. That is, each row 428 typically represents a unique tuple or record, and each column 430 is typically associated with a definition of a particular field 420. A table 418 typically is defined as a collection of the fields 420, and is given a unique identifier.

The data dictionary 404 includes one or more packages 434, one or more domains 438, one or more data elements 442, and one or more tables 446, which can at least generally correspond to the similarly titled components 310, 314, 322, 318, respectively, of FIG. 3. As explained in the discussion of FIG. 3, a package 434 includes one or more (typically a plurality) of domains 438. Each domain 438 is defined by a plurality of domain elements 440. The domain elements 440 can include one or more names 440a. The names 440a serve to identify, in some cases uniquely, a particular domain 438. A domain 438 includes at least one unique name 440a, and may include one or more names that may or may not be unique. Names which may or may not be unique can include versions of a name, or a description, of the domain 438 at various lengths or levels of detail. For instance, names 440a can include text that can be used as a label for the domain 438, and can include short, medium, and long versions, as well as text that can be specified as a heading. Or, the names 440a can include a primary name or identifier and a short description or field label that provides human understandable semantics for the domain 438.

In at least some cases, the data dictionary 404 can store at least a portion of the names 440a in multiple languages, such as having domain labels available for multiple languages. In embodiments of the disclosed technologies, when domain information is used for identifying relationships between tables or other database elements or objects, including searching for particular values, information, such as names 440a, in multiple languages can be searched. For instance, if "customer" is specified, the German and French portion of the names 440a can be searched as well as an English version.

The domain elements 440 can also include information that is at least similar to information that can be included in the schema 412. For example, the domain elements 440 can include a data type 440b, a length 440c, and a number of decimal places 440d associated with relevant data types, which can correspond to the technical data elements 422b, 422c, 422d, respectively. The domain elements 440 can include conversion information 440e. The conversion information 440e can be used to convert (or interconvert) values entered for the domain 438 (including, optionally, as modified by a data element 442). For instance, conversion information 440e can specify that a number having the form XXXXXXXXX should be converted to XXX-XX-XXXX, or that a number should have decimals or comma separating various groups of numbers (e.g., formatting 1234567 as 1,234,567.00). In some cases, field conversion information for multiple domains 438 can be stored in a repository, such as a field catalog.

The domain elements 440 can include one or more value restrictions 440f. A value restriction 440f can specify, for example, that negative values are or are not allowed, or particular ranges or threshold of values that are acceptable for a domain 438. In some cases, an error message or similar indication can be provided as a value is attempted to be used with a domain 438 that does not comply with a value restriction 440f. A domain element 440g can specify one or more packages 434 that are allowed to use the domain 438.

A domain element 440h can specify metadata that records creation or modification events associated with a domain element 438. For instance, the domain element 440h can record the identity of a user or application that last modified the domain element 440h, and a time that the modification occurred. In some cases, the domain element 440h stores a larger history, including a complete history, of creation and modification of a domain 438.

A domain element 440i can specify an original language associated with a domain 438, including the names 440a. The domain element 440i can be useful, for example, when it is to be determined whether the names 440a should be converted to another language, or how such conversion should be accomplished.

Data elements 442 can include data element fields 444, at least some of which can be at least generally similar to domain elements 440. For example, a data element field 444a can correspond to at least a portion of the name domain element 440a, such as being (or including) a unique identifier of a particular data element 442. The field label information described with respect to the name domain element 440a is shown as separated into a short description label 444b, a medium description label 444c, a long description label 444d, and a header description 444e. As described for the name domain element 440a, the labels and header 444b-444e can be maintained in one language or in multiple languages.

A data element field 444f can specify a domain 438 that is used with the data element 442, thus incorporating the features of the domain elements 440 into the data element. Data element field 444g can represent a default value for the data element 442, and can be at least analogous to the default value 422f of the schema 412. A created/modified data element field 444h can be at least generally similar to the domain element 440h.

Tables 446 can include one or more table elements 448. At least a portion of the table elements 448 can be at least similar to domain elements 440, such as table element 448a being at least generally similar to domain element 440a, or data element field 444a. A description table element 448b can be analogous to the description and header labels described in conjunction with the domain element 440a, or the labels and header data element fields 444b-444e. A table 446 can be associated with a type using table element 448c. Example table types include transparent tables, cluster tables, and pooled tables, such as used as in database products available from SAP SE of Walldorf, Germany.

Tables 446 can include one or more field table elements 448d. A field table element 448d can define a particular field of a particular database table. Each field table element 448d can include an identifier 450a of a particular data element 442 used for the field. Identifiers 450b-450d, can specify whether the field is, or is part of, a primary key for the table (identifier 450b), or has a relationship with one or more fields of another database table, such as being a foreign key (identifier 450c) or an association (identifier 450d).

A created/modified table element 448e can be at least generally similar to the domain element 440h.

Example 6—Example Metadata Model

FIG. 5 illustrates a definition of a metadata model 500. The metadata model 500, in particular, represents a view, such as a Core Data Services view of SAP SE, of Walldorf, Germany. The metadata model 500 can include a variety of different components, at least some of which can be considered to be metadata models. That is, the metadata model 500 can be a model that is based at least in part on multiple sub-models. The sub-models can specify particular aspects of the overall metadata model 500.

The metadata model 500 can optionally include one or more annotations 504. An annotation can be a metadata component that can be added to a metadata model. For example, a provider may supply a base model, and individual users or customers may wish to add metadata that is specific to their operating environment and use cases. The ability to add annotations can thus enhance usability by allowing for custom metadata elements, without impacting other users of a base metadata model. Annotations can be specified for different software layers or frameworks.

In the example shown, annotations 504 can be indicated as annotations using particular syntax elements, such as by preceding an annotation with the "@" symbol. In at least some cases, annotations 504 can also be indicated by placing them in the appropriate portion of a metadata model, such as in a header section or another section designated for annotations. In some cases, annotations 504 can reference other metadata models, such as a metadata model of a data source, or can reference a data source that is associated with a metadata model. In either event, such an association 504 can create a dependency between the metadata model 500 and the other metadata model/data source.

The metadata model 500 can include instructions 508, in this case a SQL statement 510, defining a core metadata model/object having an identifier 512 (which can be used, for example to later access or activate, such as to instantiate, the metadata model). In particular, the instructions 508 shown define a view. The annotations 504 further specify properties of the view, as do other portions of the metadata model 500 that will be further described.

The instructions 508 can specify one or more data sources 516. Data sources 516 can define data to which at least a portion of the metadata of the metadata model 500 will apply, and can also supply additional metadata for the metadata model 500. Note that the metadata model 500 can be, in at least a sense, dependent on referenced data sources 516. For example, if the metadata model 500 relies on particular expected data or metadata of a data source 516, the metadata model may be unusable, have performance issues, or provide incorrect results if the referenced data sources do not include expected data or metadata, or are otherwise inconsistent with how the data source is used in the metadata model. As shown, the data sources 516 includes two tables, "vbak" and "vbkd." These tables will typically include metadata features such as one or more fields, where each field is associated with a data type, designations of a primary key, and optionally associations with other database components, such as association or foreign key relationships with other database tables.

The metadata model 500 can optionally include specifications of one or more associations 520. An association 520 can define a relationship to another entity. An association 520 can be processed during the use of the metadata model 500, such as being converted to a SQL expression such as a JOIN. Unlike other conditions or elements that are included in the metadata model 500, associations can define a relationship that can at least in some cases be optional, such as being selectively activated depending upon how the metadata model is accessed. For example, an association 520 can be converted to a JOIN condition that uses a table provided in a SELECT statement that references the metadata model 500.

The metadata model 500 can include one or more components 522 that specify how data retrieved using the metadata model should be processed, including to generate values that are associated with other metadata elements of the metadata model. Processing can include calculating values, such as using a formula specified in, or referenced by, the metadata model 500. In particular, a processing component 522 can specify that a particular field value should be treated as an element 524, where an element can be as described in Examples 4 and 5. Thus, the metadata model 500 can include dependencies on how elements are defined, and the metadata model 500 may not be accurate, or useable, if the element definition does not match how it is used, and intended to be used, in the metadata model 500.

The metadata model 500 can optionally include additional components, such as one or more conditions 528, or other operations, such as aggregations, unions, etc., including such operations that are typically supported by a database query language. In addition to instantiated artefacts, information about the artefacts can be stored in a persistency model, such as one or more database tables. An example persistency model that can be used with artefacts is disclosed in U.S. patent application Ser. No. 16/387,983, filed Apr. 18, 2019, and incorporated by reference herein.

Example 7—Example Metadata Model, Including Relationships with Other Metadata Models FIG. 6 illustrates how metadata models may have dependencies on other metadata models. In particular, FIG. 6 shows a view metadata model 604, which can be the metadata model 500 of FIG. 5. FIG. 6 also illustrates a metadata model 608 for an access control object (such as a DCLS, or data control language source), a metadata model 612 for a metadata extension object (such as a DDLX, or metadata extension), and a metadata model 616 for an extension element object (such as a DDLS, or data definition language source).

The access control object metadata model 608 can be used for restricting access to data that can be retrieved using the view metadata model 604. For example, the view metadata model 604 and the access control object metadata model 608 can be processed together when the view metadata model 604 is activated, such as to generate SQL commands that retrieve data for the view metadata model, but which are filtered or restricted based on the access control object metadata model. As the access control object metadata model 608 references the view metadata model 604, the access control object metadata model depends on the view existing, and on the view containing elements specified in the access control object metadata model. For example, the access control object metadata model references the "SalesOrderType" element of the view "I_SampleSalesOrder" and the authorization object "V_VBAK_AAT" with its authorization field "AUART". Thus, the first element would be undefined or unusable if the corresponding element did not exist in the view metadata model 604.

The metadata extension object metadata model 612 (which adds annotations to the view metadata model 604) has similar dependencies on the view metadata model, as does the extension element object metadata model 616 (which adds additional elements to the view metadata model).

Example 8—Example Metadata Artefact Components

FIG. 7 summarizes annotations that can be included in a metadata artefact 700 (including a data artefact which includes annotations for a metadata decorator framework such that it also can serve as a metadata artefact). An annotation 704 can indicate a scope for a metadata artefact, which can indicate a type of data artefact to which it can be applied. A scope can be, in some cases, an element (e.g., a field definition), a parameter (e.g., an input that is expected when a data artefact is used or called), or an entity type (for example, a view). In some cases, the annotation 704 can be omitted, and a type can be inferred from other aspects of the metadata artefact 700, such as if the metadata artefact includes a data selection clause or other definitional statement.

An annotation 706 can indicate how or whether a metadata artefact can be used or changed, such as with respect to a compatibility contract. Values for the annotation 706 can specify whether the metadata artefact is available for use for a given compatibility contract, whether particular annotations may or may not be changed, and whether any changes to annotations are limited to particular values.

Annotations to be applied to specific components of a data artefact are typically associated with a scope, such as an entity, role (e.g., a data artefact in the form of an authorization object defining access controls, such as implemented in products available from SAP SE, of Walldorf, Germany), parameter, element, association, or annotation. This scope can be indicated by annotations 714 for various sub-annotations (or annotation types) of a metadata annotation 710.

A sub-annotation 718 can be used to indicate that a given metadata artefact includes other metadata artefacts, such as described in Example 17. In some cases, names for data elements used in a metadata artefact can be mapped to names, or aliases, used in data artefacts to which the metadata artefact will be applied, or to metadata artefacts that may be incorporated by, or may incorporate, the metadata artefact. A mapping between a local name and alias can be specified in name.map annotation 722.

For metadata artefact annotations that are used to modify other artefacts, an option element 726 of an annotation can be used to indicate how a given component of the metadata artefact 700 should be applied to another artefact, such as whether the associated content should be added to the artefact, removed from the artefact, used to replace content in the artefact, or to synchronize the artefact. These operations will be explained in further detail in Examples 9-17.

When an operation is a replacement operation, a definition of components to be replaced can be included in a replacement definition element 730 of an annotation. In particular examples, definitions can be specified on the level of strings, annotations, data types, or elements.

A used model sub-annotation 734 can be added to artefacts modified by a given metadata artefact 700. The sub-annotation 734 can be useful when it is desired to track or identify relationships between artefacts, including to ensure that artefacts that are derived (or use) a given metadata artefact 700 are updated when the given metadata artefact is updated.

Example 9—Example Addition of Annotations to Data Artefacts

FIG. 8A illustrates how a metadata decorator artefact 808 may be applied to a data artefact 812 to add a metadata element 816 to the data artefact. Line 820 of the metadata decorator artefact 808 indicates that it has a type of "view," and therefore would be applied to other views. That is, at least in some cases, metadata decorator artefacts have a scope, which can be a particular type of data artefact, and therefore are to be applied to data artefacts having the same scope.

The metadata artefact 808 is also assigned a name or identifier 824 that serves to uniquely identify the metadata artefact 808 in a given virtual data model. In some cases, a metadata artefact is implemented using the same or similar syntax as a data artefact. In this case, it may be necessary for the metadata data artefact 808 to comply with any rules/syntax requirements that are required for data artefacts. For instance, the metadata artefact 808 includes a select statement at line 828. However, the select statement 828 can reference a table that does not exist, or that exists but does not include any data. The implementation of a metadata artefact can thus change depending on a given operating environment. If a given environment does not require particular elements, such as the select statement 828, such elements can be omitted from the metadata artefact.

The metadata artefact 808 includes an annotation 832 that can indicate, such as to a processing framework (e.g., a metadata decorator framework), how the metadata artefact 808 (or at least content associated with the annotation 832) should be processed. For example, line 836 indicates a scope for the annotation 832, which can be a specific type of metadata associated with the annotation (in this case, it applies to metadata elements having the type of "annotation"). Line 838 indicates that annotation 816 should be added to data artefacts to which the metadata artefact 808 is applied. The annotation 816 in this case adds an annotation indicating that the Trans actionCurrency field of the data element is a currency code.

Note that the metadata artefact 808 includes a cast statement at line 844. In this case, the cast statement 844 is not applied to a target data artefact. A further example will describe how the cast statement 844 can be specified to be applied to a target data artefact. The cast statement 844 does, however, indicate the field (TransactionCurrency) to which the annotation 816 should be applied.

FIG. 8A also provides code for the data artefact 812, which is a particular data artefact to which the metadata artefact 808 can be applied. Note that the data artefact 812 includes a line 854 that indicates that the data artefact is a view, which is the same type of artefact as the metadata artefact 808. The data artefact 812 includes a line 856 that incorporates the TransactionCurrency field into the data artefact. Note that the data artefact 812 does not include an annotation corresponding to the annotation 816.

A data artefact 860 corresponds to the data artefact 812 after an operation applying the metadata artefact 808 to the data artefact 812. The data artefacts 812 and 860 are identical, except that the data artefact 860 includes the annotations 816 and 870.

Typically, an operation to modify a data artefact using a metadata artefact requires the data artefact to have a common scope with the metadata artefact, and in some cases a corresponding component. For example, if an attempt was made to use the metadata artefact 808 to modify a data artefact that did not include the TransactionCurrency field, the operation attempt would fail (e.g., no action would be taken, or an error message could be returned).

In another scenario, an attempt could be made to use the metadata artefact 808 to modify a data artefact that already included a "Semantics.currencyCode" annotation. The result of this scenario can depend on a particular implementation used. In some cases, if a data artefact already contains a component corresponding to a component in a metadata artefact and an "include" operation is specified, no action is taken or an error message is returned (which, in some cases, particularly if the values associated with the component differ, such as having a metadata artefact specifying TRUE and a data artefact specifying FALSE, can include identifying differences between the components/component values). In other cases, the include operation can be treated as an update or synchronization operation, and existing components in a data artefact can be replaced with components from the metadata artefact.

It may be desirable to indicate that a data artefact was modified using a metadata artefact, or to establish a link between a data artefact and metadata artefact used to modify the data artefact. The data artefact 860 includes an annotation 870 that indicates that the data artefact was modified by the metadata artefact 808. The annotation 870 indicates that the data artefact 860 was modified by (or uses) a metadata artefact, but also specifically identifies the metadata artefact 808. In some cases, data artefacts, such as definitions of data artefacts in a data dictionary can be queried to find data artefacts modified by any metadata artefact, or by a specific metadata artefact. These annotations can be useful, for example, when it is desired to update all data artefacts that have been modified by a given metadata artefact.

In at least some implementations, notation 870 is optional. That is, the annotation 870 can be omitted when the data artefact 812 is modified, or the annotation can be removed (including manually) from the data artefact 860.

If it desired to add multiple components to appropriate data artefacts, a separate metadata artefact can be created for each component to be added. For example, metadata artefact 874 can be used to add the "currencyCode:true" annotation 876 to the CompanyCodeCurrency field of the data artefact 812, where the metadata artefact is otherwise defined in a similar manner to the metadata artefact 808. In another implementation, shown in FIG. 8B, a single metadata artefact 878 can be defined that adds the "currencyCode:true" annotation for both TransactionCurrency and CompanyCodeCurrency.

A more streamlined technique for updating multiple fields with the same annotation is illustrated in the metadata artefact 910 of FIG. 9. The metadata artefact 910 includes a "map" operation 914 that associates a local field name 916 with an alias field name 918 that may be used in data artefacts to which the metadata artefact 910 may be applied (e.g., the data artefact 850 of FIG. 8). Thus, applying the metadata artefact 910 to a data artefact will result in the annotation 914 being applied to any of the fields TransactionCurrency, CompanyCodeCurrency, or DisplayCurrency that might be included in such data artefact. Applying the metadata artefact 910 to the data artefact 812 provides an updated data artefact 920.

Example 10—Example Removal of Components from Data Artefacts

FIG. 10A provides an example of how a metadata artefact 1004 can be used to remove a component from a data artefact 1008. The data artefact 1008 corresponds to the data artefact 812 of FIG. 8. In this scenario, assume that it is desired to remove the "EndUserText.label" annotation 1012 from the data artefact 1008. This change could be because this use of applying labels directly to fields may be undesirable (instead having such labels applied as part of an element, corresponding to the field, in a data dictionary, such as using an element in a data dictionary as described in Examples 4 and 5).

The metadata artefact 1004 includes an annotation 1016 indicating that the metadata artefact has a change whose scope is for annotations (reference 1018) and where the operation is to exclude (reference 1020), or remove, such annotations if found in a data artefact to which the metadata artefact 1004 is applied. The metadata artefact 1004 includes an annotation 1024, which is therefore governed by the preceding semantic elements 1018, 1020 of the annotation 1016. Accordingly, the content of the annotation 1024, "EndUserText.label", will be removed, if present, from any data artefacts to which the metadata artefact 1004 is applied. Note that the annotation 1024 includes a specification of "ANY" (reference 1026), which acts as a wildcard such that EndUserText.label annotations are removed regardless of their content. If it was desired to only remove text labels having particular content, that content could be specified in the annotation 1024 instead of ANY, and therefore annotations would only be removed from data artefacts if they contained the text specified in the annotation 1024.

This Example 10 also illustrates that a metadata artefact can be used to carry out different types of operations. While the metadata artefact 1004 includes an operation to remove a particular annotation, the annotation 1016 has another component whose scope is a data type (reference 1032) and provides that a component 1036 (the cast statement) should be added (reference 1034) to relevant data artefacts to which the metadata artefact is applied.

A data artefact 1040 corresponds to the data artefact 1008 after the metadata artefact 1004 is applied to the data artefact 1008. Since the data artefact 1008 includes the annotation 1012, and that is responsive to the annotation 1024, the annotation 1012 is removed in the data artefact 1040. The TransactionCurrency field 1010 of the data artefact 1008 corresponds to the annotation 1016 for the metadata element 1036, and so the cast statement of the annotation 1016 has been added to the data artefact 1040.

In a similar manner as described in Example 9 for adding components (particularly, annotations), a framework used to implement metadata artefacts can be designed to take particular actions in the event a data artefact being modified by a metadata artefact does not include components specified in the metadata artefact, if the data artefact includes conflicting components, or to take different actions depending on the type of component being added, removed, or modified. As when adding components, if a metadata artefact specifies that a component should be removed, and the component is not present in a specified data artefact, no action can be taken, or an error message can be provided.

As an example of how a framework can be designed to process commands to add, remove, or modify metadata elements differently depending on the nature of a given metadata element, in some cases the cast statement associated with the metadata element 1036 is only added to a data element if an existing typing of the field (either explicitly in the data artefact or as defined in a data dictionary) differs from the typing used in the cast statement. Cast statements, in some programming languages (such as ABAP), can be used to change one or both of technical properties of a data type or semantic properties of the data type. If a data type of a metadata element in a data artefact corresponds to a data type for a metadata element in a metadata artefact, but the desired semantic properties are not associated with the data type in the data artefact (for example, by associating the data type with an element in a data dictionary, where the definition of the element specifies semantic properties for the element), a framework can automatically add a "preserving type" statement 1044 to the cast statement 1042 in the data artefact 1040. In this example, the use of the "preserving type" statement 1044 can help avoid unnecessary data type conversion, or processing to determine that data type conversion is not required. "Preserving type" can provide that the technical type interpreted by the database system remains unchanged, even if the semantics of the field in the virtual data model are changed.

In some cases, it may be desired to set the value of a component of a data artefact to a default or null value, rather than removing the component. Providing a default or null value, can, for example, be more informative to a developer than completely removing the associated component. With reference to FIG. 10B, a metadata artefact 1050 is similar to the metadata artefact 1004. However, rather than the command to remove the EndUserText.label annotation, the metadata artefact 1050 includes an annotation 1054 indicating that an annotation 1058 is to be added (references 1060, 1062). The annotation 1054 provides that an EndUserText.label element will be included, but with a value set to null.

Note that this scenario may require that the implementing framework treat a request to add a component to a data artefact that already includes a different version of the component as a request to modify an existing component (which can include modifying the component in the data artefact or deleting the conflicting component and adding the desired version of the component).

Data artefact 1070 represents the result of applying the metadata artefact 1050 to the data artefact 1008.

Example 11—Example Annotation of Data Artefact Parameters

FIG. 11 describes how metadata artefacts can be used to add annotations to parameters of a data artefact. In some cases, parameters can represent expected input when an associated data artefact is used (e.g., invoked, called, or instantiated). In the example of FIG. 11, a metadata artefact 1104 can be used to provide a default value for a parameter, such as using a current date (provided by a computing system) for a parameter intended to be supplied with a date. The metadata artefact 1104 is defined as a view (reference 1108) and includes an annotation 1112 specifying an include operation for an annotation (references 1116 and 1118) and an include operation for a data type (references 1120, 1122). An annotation 1126 corresponds to the references 1116, 1118, and indicates that a system supplied date should be used as a default value for P_KeyDate field.

Metadata element 1130 corresponds to the references 1120, 1122, and can provide that data artefacts to which the metadata artefact 1104 is applied use the DATA_ELEMENT_KEY_DATE datatype with the P_KeyDate parameter.

Example 12—Example Annotation of Data Artefact Definitions

FIG. 12 illustrates an example metadata artefact 1204 that can be used to add annotations to a base definition of a data artefact (e.g., rather than to components of the data artefact, such as annotations, elements, or parameters). The metadata artefact 1204 includes an annotation 1208 that indicates that it applies to annotations (reference 1212) and will add annotations to data members to which the metadata artefact is applied (reference 1214).

The metadata artefact 1204 includes three annotations 1220, 1222, 1224 that will be applied to data artefacts. Annotations 1220, 1222 are instructions that influence how the affected data artefact will be stored in, or processed by, a data dictionary. For example, the annotation 1220 can be used to provide that equally modelled filter conditions in the virtual data model result in equal joins being performed by the database system/in the data artefact (e.g., whether multiple joins or a single join should be defined/evaluated for multiple instances of the same filter condition).

The annotation 1222 can be used to mandate that keys specified in virtual database artefacts will be used as keys for a database artefact corresponding to the data artefact, rather than default behavior, which can be to use keys that are associated with underlying database artefacts, such as tables from which a view was created, for the database artefact corresponding to the data artefact. Annotation 1224 can be used to indicate whether data sources for the data artefact should be client dependent or client independent (e.g., whether the data selection is to be filtered by a current client of a current user session).

Note that the metadata artefact 1204 can be used to decorate (or annotate) any data artefact. Unlike other example decoration examples, the annotation 1208 does not require a particular scope or a particular component (e.g., annotation, element, or parameter) to match in a data artefact in order for the contents of the metadata element 1204 to be applied to a data artefact.

Example 13—Example Addition of Fields to Data Artefacts

A metadata artefact can be used to add other types of components to a data artefact, in addition to, or in place of, adding annotations to the data artefact. FIG. 13 illustrates a metadata artefact 1304 that includes an annotation 1308 that can be used to add a component (reference 1310), in the form of a field associated with an element (e.g., as described in Examples 4 and 5), and a component (reference 1312) that which annotates the field.

As discussed in Example 9, if a metadata artefact adds components to a data artefact, or modifies components that may already be in a data artefact, the metadata artefact need not define any data to be used with the metadata artefact. The metadata artefact may include data-related features in order to comply with programming requirements or formatting requirements, such as a dummy data selection clause.

If a metadata artefact adds data elements to a data artefact, the metadata artefact can include an actual (non-dummy) data selection clause. As shown, the metadata artefact 1304 contains a selection clause 1320 that reference a particular field 1322 of a specified table 1324, and incorporates the field 1322 as a new field 1326 of the metadata artefact. The annotation 1330 specifies that the field 1326 will be hidden (for example not available to applications or other at least certain other artefacts, which can be useful, when it is desired not to make the field available to client applications, including through data services such as OData).

In addition to adding comparatively simple components, as with the metadata artefact 1404, metadata artefacts can include more complex expressions that can be applied to data artefacts. FIG. 14 provides a metadata artefact 1404 that incudes includes a calculation 1408 that can be applied to data artefacts, as indicated by the annotation 1412. In this example, the calculation 1408 calculates a customer name from a business partner name.

In some cases, components that may be desired to be included in a data artefact using a metadata artefact may already be present in the data artefact. For example, the calculation 1408 may be included in an existing data artefact. If desired, rather than repeating the calculation, the existing data artefact can be made available for use as a metadata artefact, as illustrated in FIG. 15.

FIG. 15 illustrates a data artefact 1504 modified to serve as a metadata artefact. Note that the definition statement 1508, unlike previously described metadata artefacts, does not contain "CMD." The definition statement 1508 and a calculation 1512 (corresponding to the calculation 1408) can represent the "original" version of the data artefact 1504, prior to being modified to serve as a metadata artefact. Annotation 1516 allows the data artefact 1504 to serve as a metadata artefact, as it includes a semantic element (@MetadataDecorator) that triggers application of the decorator framework and defines a scope (element, reference 1520) and an operation (include, reference 1522) for the calculation 1512.

The data artefact 1504 also includes an annotation 1530 that maps the local field names "name1" and "name2" to aliases "OrganizationBPName1" and "OrganizationBPName2" that are expected to be in data artefacts to which the data artefact 1504 is to be applied. The annotation 1530 accounts for these otherwise minor differences between the calculation 1512 and the calculation 1408.

Example 14—Example Additions of Associations to Data Artefacts

Metadata artefacts can be used to create associations between virtual data model artefacts. Associations can be a way of linking two virtual data model artefacts, and can be thought of as a lazy JOIN or JOIN on demand. In a particular implementation, association functionality can be implemented as in the Core Data Services technologies of SAP SE, of Walldorf, Germany.

FIG. 16 illustrates a metadata artefact 1604 that exposes an association_Product (line 1620). A metadata decorator annotation 1618 indicates that the association 1620 will be added to data artefacts to which the metadata artefact 1604 is applied, where the annotation 1622 (added in response to metadata decorator annotation 1614) specifies that the association_Product serves as a foreign key (on the field Product). In addition, the association definition 1630 will be incorporated into any data artefacts to which the metadata artefact 1604 is applied, given that metadata decorator annotation 1618 adds the association 1620 to such data artefacts.

As with other metadata artefacts described in the present disclosure, a metadata artefact that adds associations to data artefacts can include a mapping statement that maps local names used in the metadata artefacts to various aliases that may be used in data artefacts to which the metadata artefact may be applied. FIG. 17A illustrates an example metadata artefact 1704 that includes a mapping statement 1708 that maps multiple local names to aliases. Note that a single local name may be mapped to multiple aliases.

The metadata artefact 1704 includes multiple decorator annotations 1712, 1716, 1720, 1724. Annotations 1720, 1724 are similar to annotation 1622, in that the associations defined in the metadata artefact 1704 will be added as components to data artefacts to which the metadata artefact is applied. Annotations 1712, 1716 are generally similar to the annotation 1614, in that they indicate that the annotations for the association will be added to data artefacts. However, the annotations 1712, 1716 also indicate (references 1730, 1732) that the typing of the fields will match the data type specified by the cast statements (1736, 1738).

FIG. 17B provides a definition for a data artefact 1740 to which the metadata artefact 1704 can be applied. FIG. 17B also provides a definition for a data artefact 1750, which corresponds to the data artefact 1740 after the metadata artefact 1704 has been applied to the data artefact 1740.

Example 15—Example Replacement of Components in Data Artefacts

In addition to adding components to, or removing components from, a data artefact, metadata artefacts can be used to replace components in a data artefact. In at least some cases, equivalent functionality can be carried out by removing existing components and then adding new components. However, having an explicit "replace" function can make it easier to accomplish replacements, and make it easier to understand the intent of a metadata artefact.

FIG. 18 illustrates a data artefact 1804 having an annotation 1808 that is to be replaced. A metadata artefact 1812 includes an annotation 1816 specifying that its scope is an annotation (reference 1820) and that it defines a replacement operation (reference 1822). In order to help identify what is being replaced, the annotation 1816 includes a replacement definition 1826, which indicates that the "NewTotalNetAmount" is the component whose annotation is being added to a modified data artefact.

The metadata artefact 1812 includes a component of the annotation 1808, indicating that this is the component to be removed from a modified data artefact. The metadata artefact 1812 includes an updated annotation 1830 to be added to the data artefact 1804, as well as a new component 1834.

Data artefact 1850 represents the result of applying the metadata artefact 1812 to the data artefact 1804. Note that the annotation 1808 has been replaced with the annotation 1830. However, an element 1810 of the data artefact 1804 was not replaced with the element 1834, since the annotation 1816 did not specify a scope of "ELEMENT," only "ANNOTATION."

The replacement technique used for the metadata artefact 1812 can be broadened such that a broader range of components can be updated to include a replacement annotation (or, more generally, other types of updated components). For example, the metadata artefact 1812 will only be applied to aggregations of the type "#SUM." Metadata artefact 1860 is similar to metadata artefact 1812, but includes a mapping statement 1864 that maps the local component name "TotalNetAmount" to any aggregation statement, of any type. That is, as long as a component has the "#" token, a replacement annotation 1868 of the metadata artefact 1860 will be applied. Line 1872 specifies that the aggregation type originally specified in the data artefact (e.g., 1808) will be preserved after the data artefact is updated using the metadata artefact 1860.

Example 16—Example Synchronization of Data Artefact Components

Example 15 described how a replace operation can be used to remove a particular component and add a different or revised component. However, in at least some implementations, a replace operation may only operate on a specified component. Consider a scenario where a developer wishes to synchronize data artefacts so that a particular component only includes specified annotations, and no others. A replace operation may provide that a version of a particular annotation is consistent, but may not remove additional annotations that might be present in a data artefact. This Example 16 describes a synchronize operation, which results in the removal of components that are present in a data artefact and are not specified in a metadata element used for the synchronization (at least, for any components specified in the metadata artefact).

FIG. 19 presents a data artefact 1904 to which a metadata artefact 1920 will be applied. The data artefact 1904 includes an element 1906 ("Product") having an annotation 1908. The metadata artefact 1920 includes an annotation 1922 specifying that it applies to annotations (its scope, reference 1924) and that a synchronization operation is to be carried out (reference 1926). A body of the annotation 1920 specifies an annotation 1930.

A data artefact 1940 represents the result of applying the metadata artefact 1920 to the data artefact 1904. Note that the annotation 1930 has been added to the data artefact 1940. Since the metadata artefact 1920 did not include the annotation 1908, the annotation 1908 has been removed from the data artefact 1904 in producing the data artefact 1940. Note also that the metadata artefact 1920 includes an element 1950, but that this element was not inserted into the data artefact 1904, and the element 1906 was not removed. This is because the annotation 1920 had a scope of "annotation," not "element" or "data type."

Example 17—Example Merged Metadata Artefacts

Just as it can be useful to have modularized code, it can be useful to have modularized metadata artefacts. In this way, metadata artefacts can be made progressively more complex by including functionality from other metadata artefacts. This functionality can be similar to programming concepts such as the #include directive of C++. Typically, the functionality of a given metadata artefact and any incorporated metadata artefacts are logically merged when the given metadata artefact is applied to a data artefact. Or, the metadata artefacts can be merged after a metadata artefact is defined.

Figure 20:
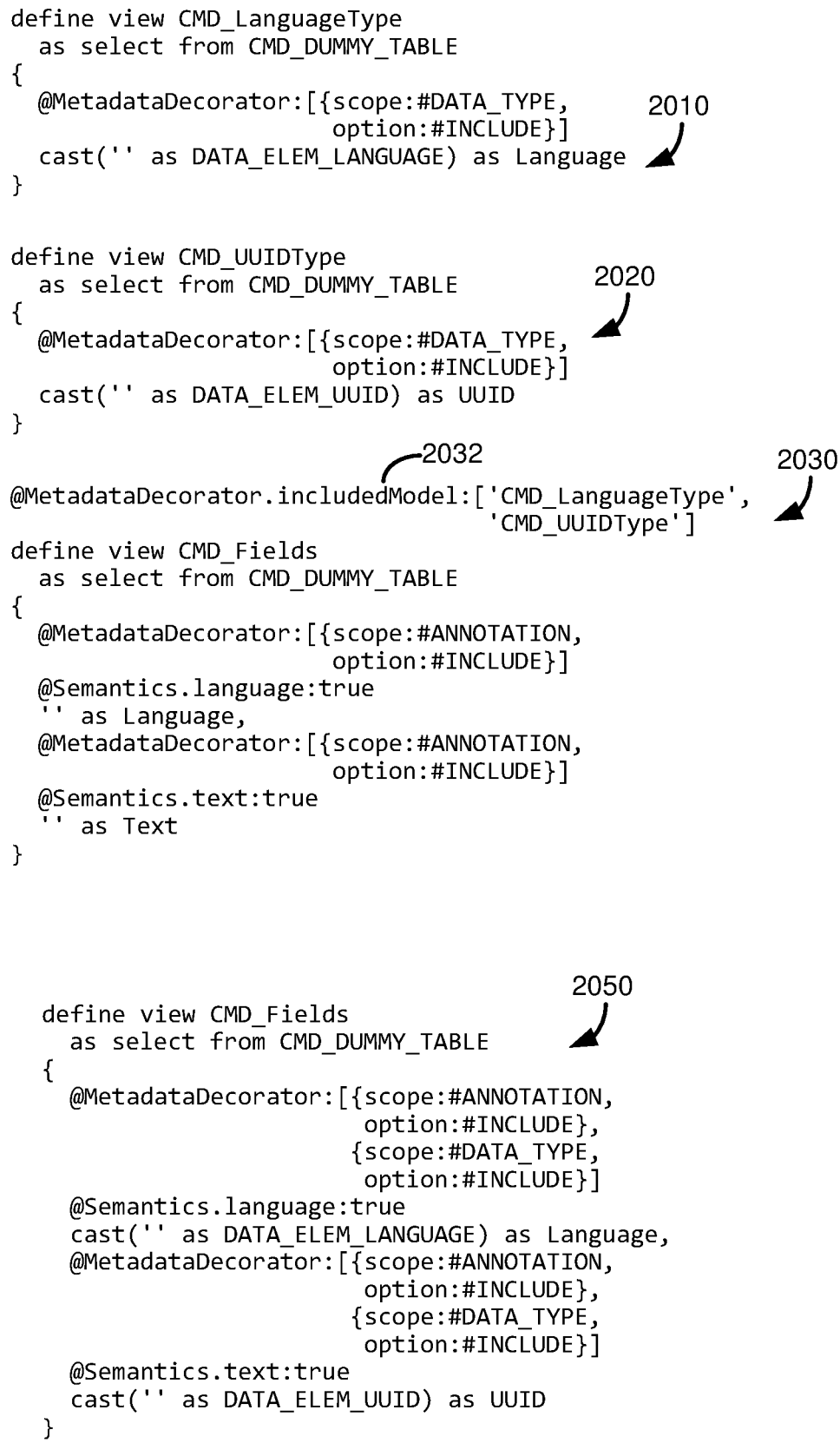
FIG. 20 is code illustrating how metadata artefacts can be logically merged.

FIG. 20 illustrates a metadata artefact 2030 that incorporates metadata artefacts 2010 and 2020 using an "includedModel" statement 2032. Metadata artefact 2050 represents the effective, logically merged metadata artefact, produced from the metadata artefact 2030 and its incorporated metadata objects 2010, 2020.

It can be possible that multiple metadata artefacts modify the same component, including in inconsistent ways, or contain conflicting operations for a component (e.g., one metadata artefact adds an annotation that is then removed by another metadata artefact). A framework that implements metadata artefacts can check for such possible inconsistencies and can either return an error or can include rules for resolving at least certain kinds of conflicts (e.g., having operations in an explicitly defined metadata artefact taking precedence over possibly conflicting operations in an incorporated metadata artefact).

Also note that multiple levels of nesting or incorporation can be used. That is, for example, the metadata artefact 2030 could itself be incorporated into other metadata artefacts.

Example 18—Example Decorator Framework

Figure 21:
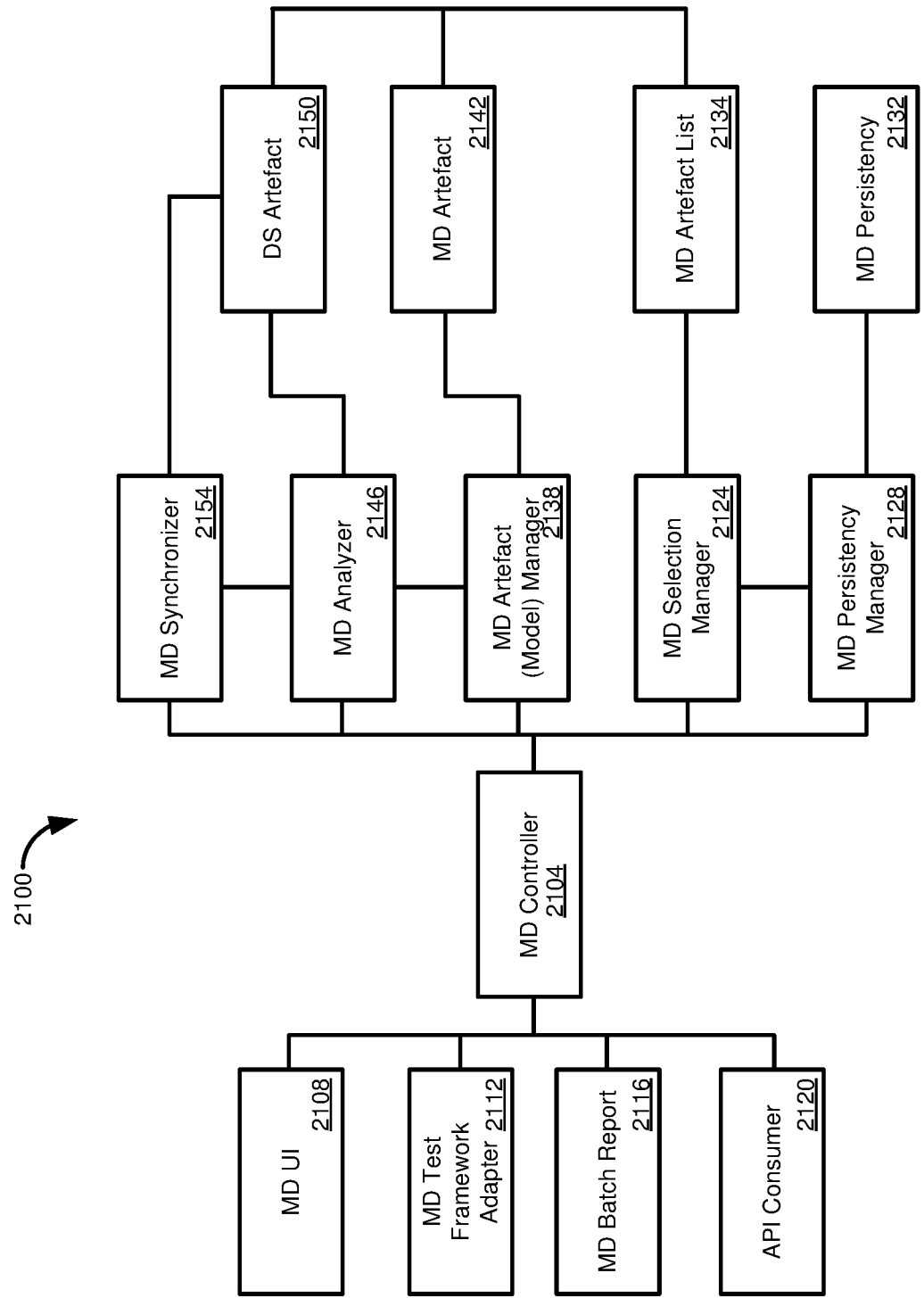
FIG. 21 is block diagram of components of a decorator framework that can be used to implement disclosed technologies.

FIG. 21 illustrates a metadata annotation, or decorator, framework 2100 that can be used to implement metadata artefacts that are useable to annotate data artefacts, such as described in Examples 1, 2, and 9-17. The framework 2100 includes a metadata decorator controller 2104. The metadata decorator controller 2104 can orchestrate processes involving metadata artefacts, including providing an interface (e.g., an application program interface, or "API") that can be called by various consumers to take actions such as querying, creating, and editing metadata artefacts or applying metadata artefacts to data artefacts. For example, a metadata decorator user interface 2108 can allow users to call such functionality.

It can be useful to check metadata artefacts prior to their use. For example, it may be desirable to confirm that a metadata artefact is syntactically and semantically correct. If a metadata artefact incorporates other metadata artefacts, it may be desirable to confirm that the collection of metadata artefacts does not contain inconsistencies. Similarly, if multiple metadata artefacts are to be applied, it can be useful to confirm that the collective operations of the metadata artefacts do not conflict, including considering an order in which the metadata artefacts are to be applied.

In some cases, functionality for carrying out these actions can be directly included in the framework 2100. In other cases, suitable functionality may exist elsewhere in a software application or application suite, and can be leveraged by the framework 2100. The framework 2100 can include a metadata decorator test framework adapter 2112 that can allow the framework to access existing test functionality. In a particular implementation, the test framework can be the ABAP Test Cockpit software available from SAP SE, of Walldorf, Germany. In particular, the ABAP Test Cockpit includes functionality for analyzing CDS views. As described, in an implementation, metadata artefacts can be CDS Metadata Decorator (CMD) models (or artefacts) that can be a particular type of CDS view, and thus test and analysis features of the ABAP Test Cockpit can be applied to CDM models. The metadata decorator controller 2104 can call functions of the test framework adapter 2112, and can also expose APIs that can be called by the test framework adapter (e.g., to carry out operations specific to metadata artefacts, which operations are carried out by other components of the framework 2100).

The framework 2100 can include a batch report component 2116. The batch report component 2116 can communicate with the metadata decorator controller 2104 to perform functions such as analyzing multiple metadata artefacts. The batch report component 2116 can also be used to synchronize data artefacts using specified metadata artefacts. Actions carried out using the batch report component 2116 can be executed on an ad-hoc basis (e.g., in response to a user request) or can be carried out according to a schedule or upon various triggers.

Other applications may be permitted to access functionality of the framework 2100 though a consumer API 2120. The consumer API 2120 can include similar functionality as the metadata decorator user interface 2108, but the API methods can be called by other applications, rather than using the internal user interface component. In addition, while the commands sent to the consumer API 2120 can be from a user interface of another application, they need not be (or at least need not be directly triggered or requested by an end user, but rather can be called by processes of such other application).

It can be useful to maintain summary information regarding metadata artefacts to facilitate the process of searching, comparing, analyzing, or updating metadata artefacts. In some cases, this information can be stored in a persistency model, such as in tables of a relational database system, including as described in U.S. patent application Ser. No. 16/387,983. A metadata artefact selection manager component 2124 can be responsible for selecting appropriate metadata artefacts, such as by issuing commands to store, retrieve, modify, or delete metadata artefacts to a metadata artefact persistency manager 2128, which stores the metadata artefacts, or their summary information, in a metadata artefact persistency layer 2132. The metadata artefact selection manager 2124 can include queries, and functionality for executing such queries, to carry out requested operations. Query results can be stored as metadata artefact lists 2134 (e.g., table 2850 of FIG. 28B).

A metadata artefact manager 2138 can manage metadata artefacts 2142, including having functionality for checking the consistency and functionality of metadata artefacts. These checks can be carried out using the metadata decorator controller 2104 and the test framework adapter 2112, in some cases. In other cases, the checks can be carried out by a metadata artefact analyzer 2146 (e.g., functions, which can be accessed through an API, for providing various checks). The metadata artefact analyzer 2142 can also include functionality for analyzing data artefacts 2150, such as to determine whether a metadata artefact can be applied to a data artefact, or determining whether a data artefact is inconsistent with a specified metadata artefact. In the event a data artefact is inconsistent with a specified metadata artefact, the metadata artefact analyzer 2146 can trigger synchronization using a metadata artefact synchronizer component 2154.

The metadata artefact manager 2138 can also include functionality for creating, deleting, or modifying metadata artefacts. Modifications can be communicated to the selection manager 2124 or the persistency manager 2128, such as to update artefact lists 2134 or add, remove, or update summaries of metadata artefacts in the persistency layer 2132.

Example 19—Example Decorator Framework Processes

FIGS. 22-27 are timing diagrams illustrating various operations that can be carried using metadata artefacts and data artefacts, including using components of the framework 2100 of FIG. 21.

Figure 22:
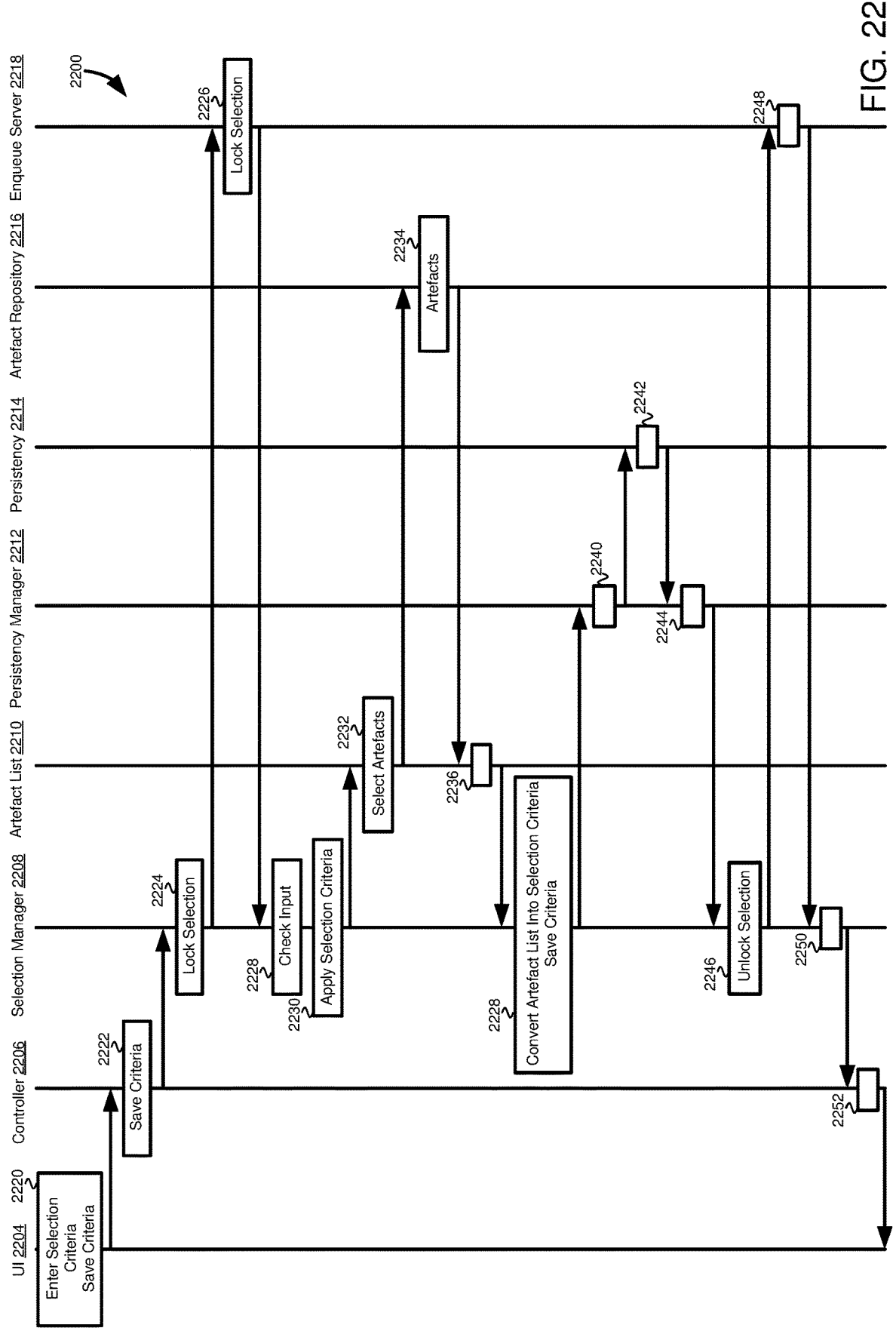
FIG. 22 is a timing diagram of a process for persisting artefact selection criteria.
Figure 28A:
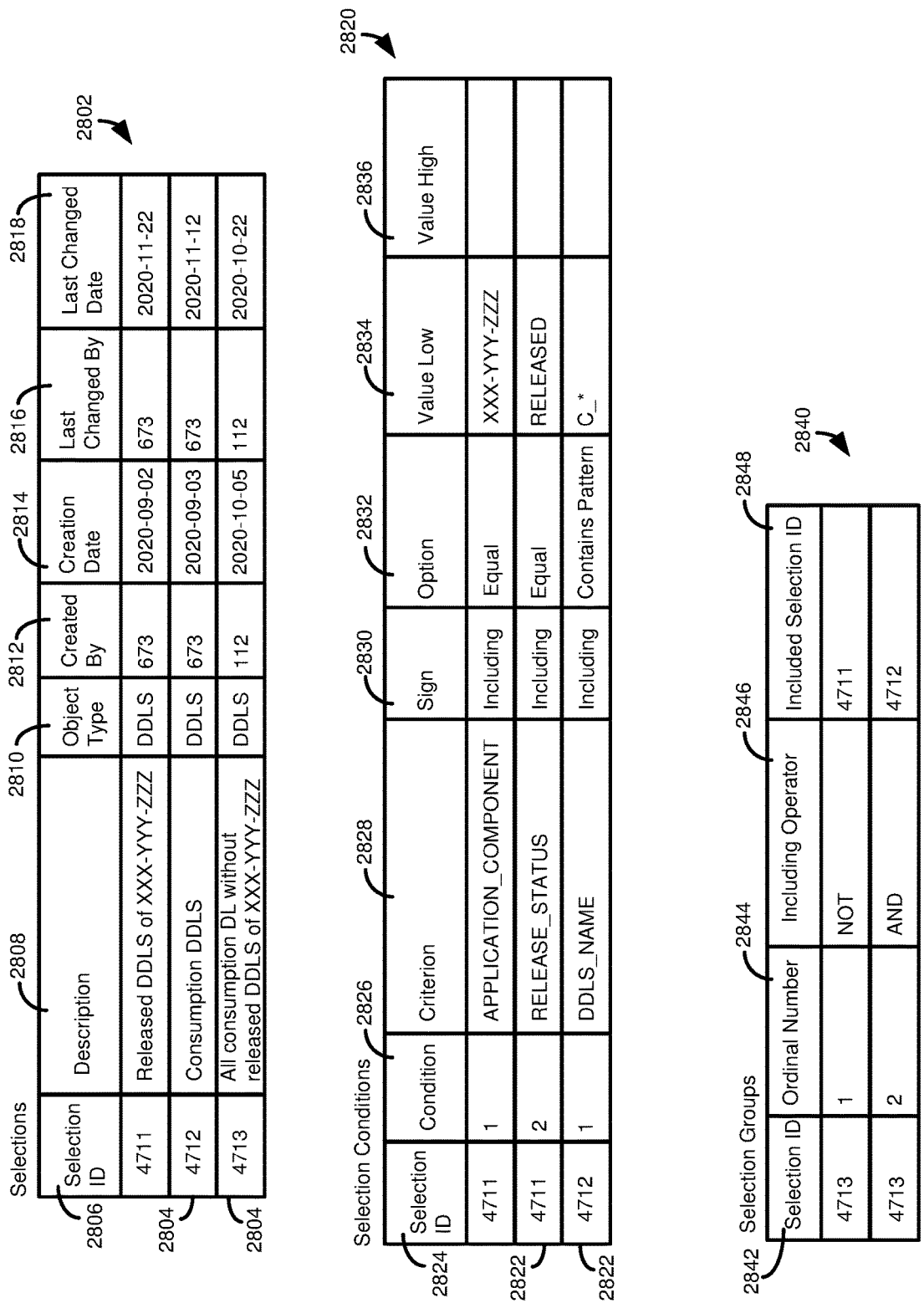

FIG. 22 is a timing diagram of a process 2200 for creating selection criteria for artefacts, such as data artefacts or metadata artefacts, in a repository. The selection criteria can represent a saved query (or query components) that can be used as part of other processes, such as a process to apply metadata artefacts to data artefacts (including as part of a synchronization request) or a process to update or edit metadata artefacts. FIG. 28A provides an example of a data model that can be used to store selection criteria.

The process 2200 can be implemented using a user interface component 2204, a controller 2206, a selection manager 2208, an artefact list 2210, a persistency manager 2212, and a persistency layer 2214, which components can have functions analogous to those described for the similarly titled components of the framework 2100. The process 2200 can also use an artefact repository 2216, which can store data artefacts and metadata artefacts, and an enqueue server 2218, which can be used to help avoid concurrency problems that could otherwise occur if multiple users were maintaining the same artefacts in parallel. Such task management can include locking objects upon the request of one process so that they cannot be changed by other processes, and releasing such locks. In some cases, an enqueue server 2218 can include multi-version concurrency control ("MVCC") functionality, which can generally be implemented in a similar manner as MVCC database systems. In a particular example, the enqueue server 2218 can be the enqueue server used in ABAP-based technologies (including NetWeaver) available from SAP SE, of Walldorf, Germany.

At 2220, a user enters artefact selection criteria. Artefact selection criteria can include identifiers or partial identifiers for a name of an artefact, or for particular properties of desired artefacts. For example, search criteria can include fields/elements used in an artefact, annotations or annotation values used in an artefact, relationships between artefacts (for example, finding metadata artefacts that incorporate other metadata artefacts), artefacts associated with particular software applications or components or particular developers, other factors, or combinations of thereof. The selection criteria can be saved and then sent from the user interface 2204 to the controller 2206, which can save the selection criteria at 2222.

The controller 2206 can request that the selection manager 2208 lock the selection criteria (e.g., so that it cannot be changed during the process 2200). The selection manager 2208 issues a lock request at 2224 to the enqueue server 2218, which locks the selection at 2226, and can return a lock indicator (e.g., success or failure) to the selection manager 2208.

At 2228, the selection manager can check the selection criteria, such as for security (e.g., to check for SQL injections) or validity purposes (e.g., confirm that specified fields are valid in a data dictionary). In some cases, it may be desired to save selection criteria, while in other cases, it may be desired to save an object or artefact list that indicates artefacts responsive to selection criteria. If it is desired to save a list of artefacts responsive to a query, the selection manager 2208 can apply selection criteria at 2230, creating an artefact list 2210 (which can be an instance of an abstract data type or a data structure, or an abstract data type that includes a data structure as a data member, or can be a table, such as table 2850 of FIG. 28B) that at 2232 requests a selection of appropriate artefacts 2234 from the artefact repository 2216. The responsive artefacts, or identifiers for such artefacts, are stored in the artefact list at 2236.

At 2238, if requested, the selection manager 2208 converts the list into the selection criteria. That is, an artefact list can be a list of artefacts, and the representation in table 2850 can be a representation of the artefact list using a selection criteria notation/persistency model. At 2238, the selection manager 2208 saves the selection criteria by issuing a command to the persistency manager 2212, which initiates a save operation at 2240, causing artefacts 2242 to be stored in the persistency layer 2214. The persistency manager 2212 can then return a result of the save operation (e.g., success or failure) to the selection manager 2208 at 2244.

The selection manager 2208, at 2246, can issue a request to the enqueue server 2218 to unlock the selection criteria. The enqueue server 2218 can unlock the selection criteria at 2248 and return a result of the operation to the selection manager 2208. The selection manager 2208 and controller 2206 return control, and optionally a success or failure indication, to the user interface 2204 at 2250, 2252.

Figure 23:
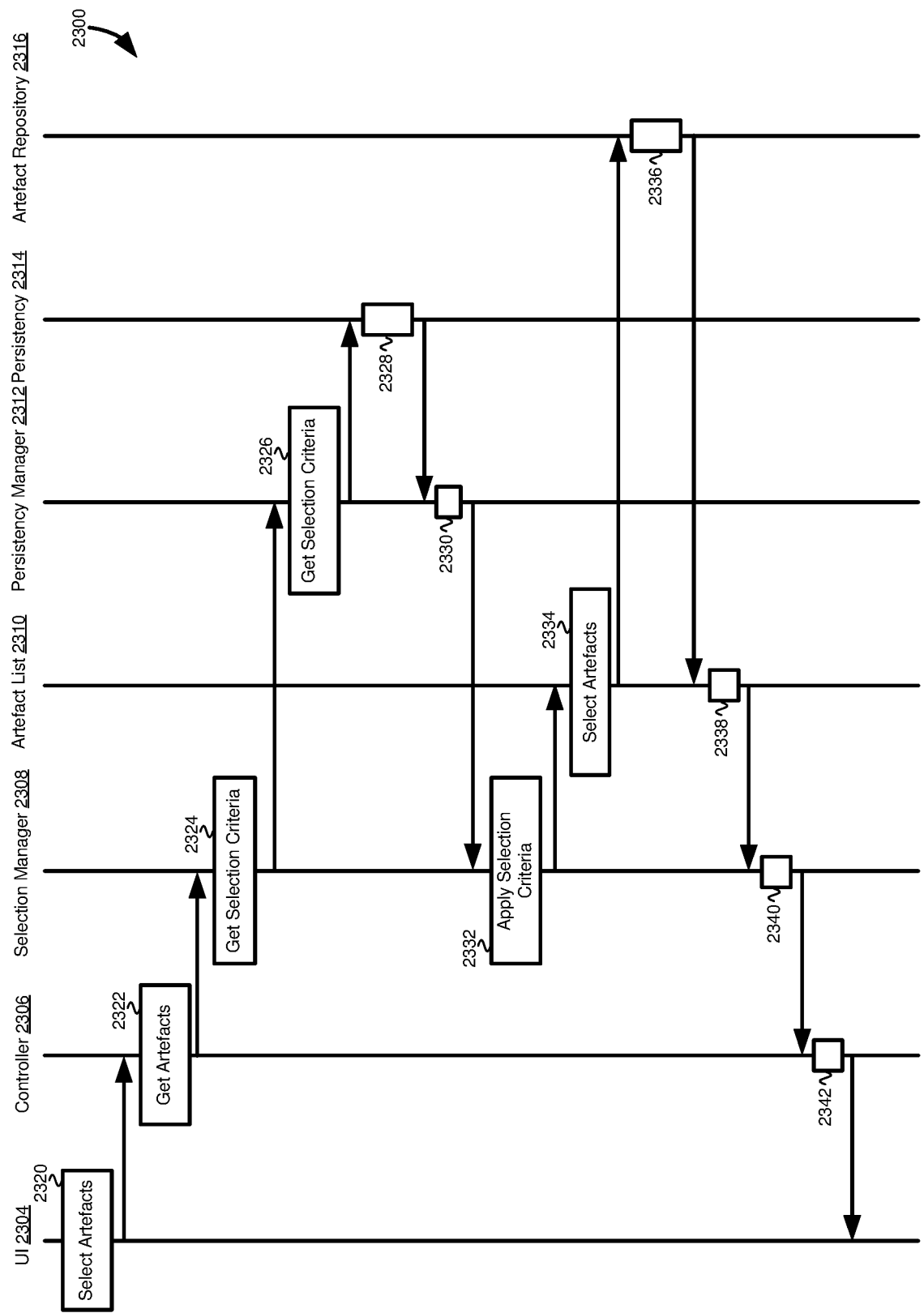
FIG. 23 is a timing diagram of a process for selecting artefacts.

FIG. 23 is a timing diagram of a process 2300 for selecting artefacts, such as data artefacts or metadata artefacts, in a repository. In some cases, the selection can be carried out using previously saved selection criteria (e.g., by providing an identifier for selection criteria saved using the process 2200 of FIG. 22). In other cases, the selection criteria are provided as part of the process 2300. The process 2300 can be implemented using a user interface component 2304, a controller 2306, a selection manager 2308, an artefact list 2310, a persistency manager 2312, a persistency layer 2314, and an artefact repository 2316 which components can have functions analogous to those described for the similarly titled components 2204-2216 of the process 2200.

At 2320, selection criteria, either explicitly or by reference to a selection identifier for previously defined selection criteria, are received through the user interface 2304. The selection request is sent to the controller 2306 by the user interface 2304. At 2324, if the request is based on an identifier for previously defined selection criteria, the selection manager 2308 can fetch the saved selection criteria by issuing a request to the persistency manager 2312. The persistency manager 2312 processes the request at 2326 by fetching the requested selection criteria 2328 from the persistency manager 2314 and returning the saved criteria to the selection manager 2308 at 2330.

At 2332, the selection criteria, as retrieved at 2324 or supplied at 2320, are applied by the selection manager 2308. The request creates at artefact list 2310 at 2334, which selects the artefacts 2336 from the artefact repository 2316 and stores the artefacts (either the artefacts or their identifiers) in the artefact list. The artefact list 2310 can be returned to the selection manager 2308 at 2338, and then in turn to the controller 2306 and the user interface 2304 at 2340, 2342.

Figure 24:
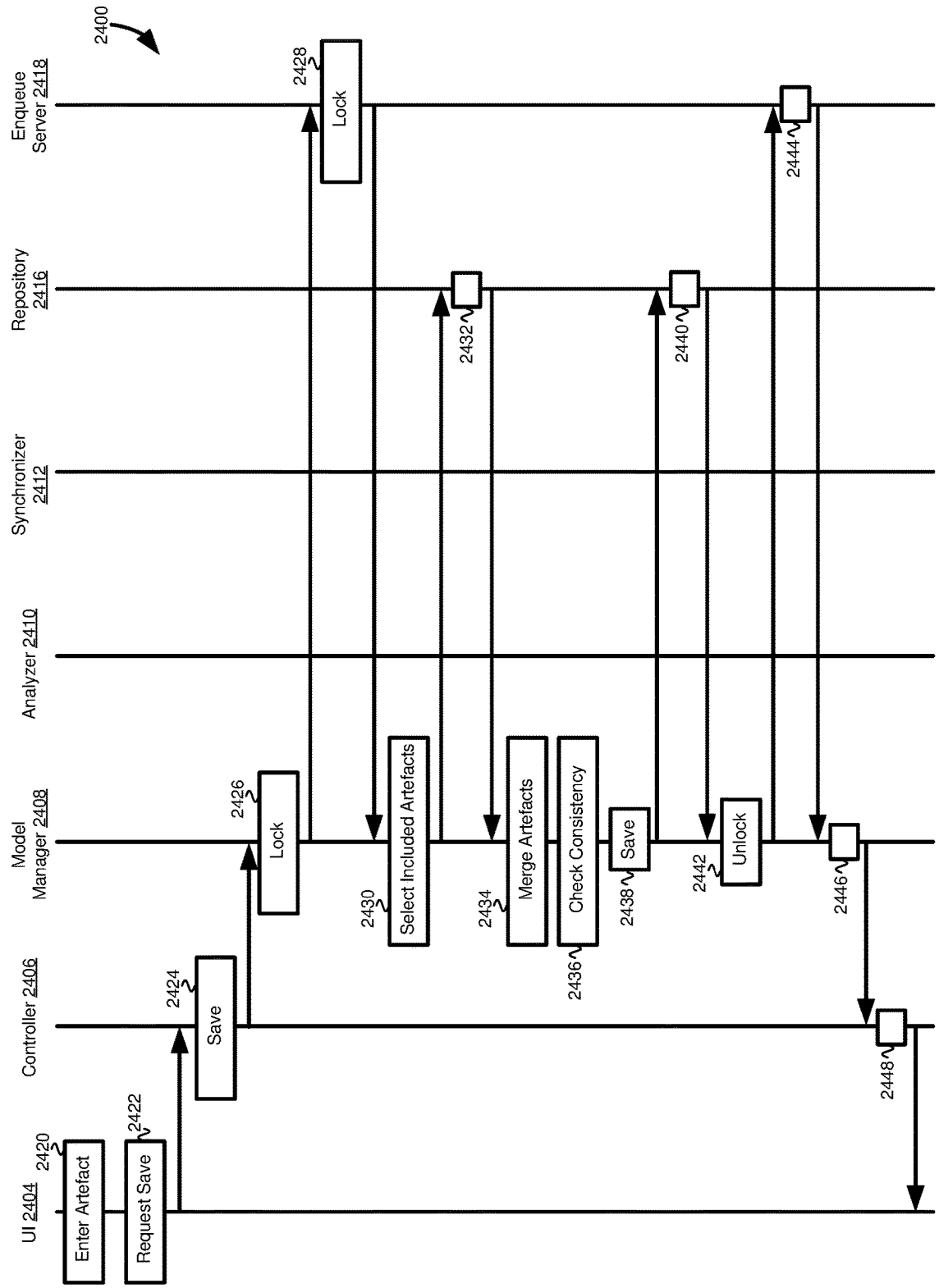
FIG. 24 is a timing diagram of a process for creating a metadata artefact.

FIG. 24 is a timing diagram of a process 2400 for creating a metadata artefact. The process 2400 is shown as implemented by a user interface component 2404, a controller 2406, a repository 2416, and an enqueue server 2418, which can be implemented as described for the correspondingly titled components 2204, 2206, 2216, 2218 of FIG. 22. The process 2400 is also implemented using a model manager 2408, an analyzer 2410, and a synchronizer 2412, which can be implemented as described for the corresponding components 2138, 2146, 2154 of FIG. 21.

At 2420, a user enters a definition for a metadata artefact using the user interface 2404. The user interface 2404 issues a request at 2422 to the controller 2408 to save the metadata artefact. The controller 2408 initiates the save process at 2424 by instructing the model manager 2408 to lock the identified metadata artefact. At 2426, model manager 2408 issues a lock request to the enqueue server 2418, which locks the metadata artefact at 2428 and returns a response (e.g., indicating success or failure) to the model manager. The model manager 2408 determines whether the metadata artefact has been defined as including any other metadata artefacts. If so, the model manager 2408 selects the included artefacts 2432 from the repository 2416 at 2430. The metadata artefacts can then be merged by the model manager 2408 at 2434, and checked for consistency at 2436. If no error was detected, the model manager 2408 saves the metadata artefacts 2444 in the repository 2416 at 2438.

After the metadata artefact has been saved, the model manager 2408, at 2442, issues a command to the enqueue server 2418 to unlock the metadata artefact, which the enqueue server does at 2444, along with returning an operation indicator to the model manager. The result of the save operation can then be returned by the model manager 2408 to the controller 2406, and then by the controller 2406 to the user interface 2404, at 2446, 2448.

Figure 25:
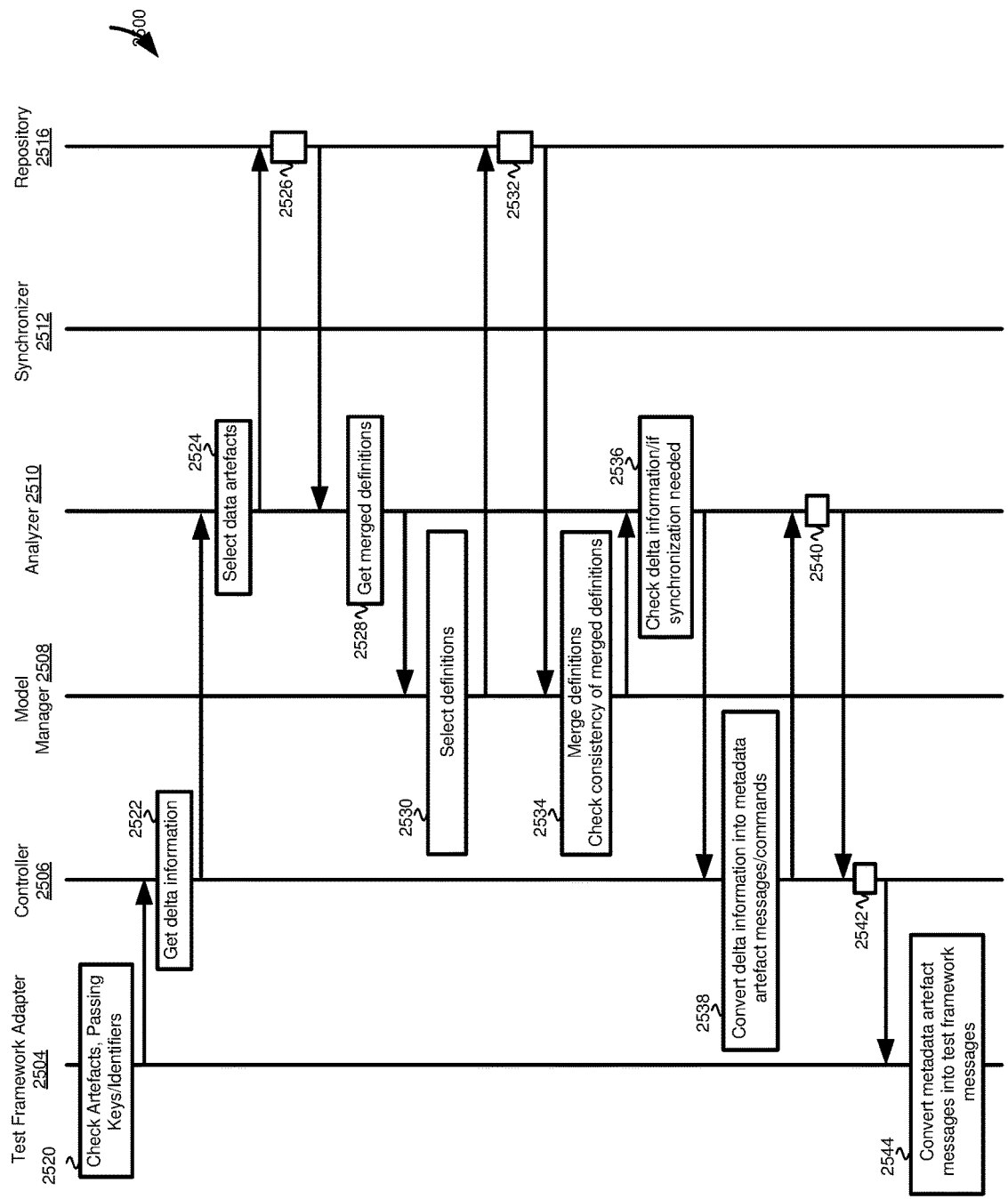
FIG. 25 is a timing diagram of a process for checking the consistency of data artefacts.

FIG. 25 is a timing diagram of a process 2500 for checking the consistency of metadata artefacts. The process 2500 is shown as implemented by a test framework adapter 2504, which can be the test framework adapter 2112 of FIG. 21. The process 2500 is further implemented by a controller 2506, a model manager 2508, an analyzer 2510, a synchronizer 2512, and a repository 2516, which correspond to the similarly titled components 2406, 2408, 2410, 2412, 2416 of FIG. 24.

At 2520, a request is sent by the test framework adapter 2504 to check the consistency of two or more metadata artefacts and data artefacts, which can include passing their keys (identifiers) to the controller 2506. The controller 2506 requests delta information (e.g., differences between the metadata artefacts and the data artefacts on which the metadata artefacts were applied) at 2522 by issuing a request to the analyzer 2510. The analyzer 2510 selects the appropriate metadata artefacts 2526 from the repository at 2524. At 2528, the analyzer 2510 calls the model manager 2508 to trigger a process for merging metadata artefact definitions, if required, and checking the consistency of any merged definitions (e.g., for any composite metadata artefacts). The metadata artefacts and the data artefacts, or information regarding such artefacts, is sent to the model manager 2508 by the analyzer 2510 at 2528.

At 2530, the model manager 2508 selects the definitions 2532 of the metadata artefacts from the repository 2516 at 2530. At 2534, the model manager 2508 merges metadata artefact definitions, if appropriate. The model manager 2508 also checks the consistency of the merged definitions at 2534. At 2536, the analyzer 2510 checks the definitions for the selected metadata artefacts to determine if any differences are detected. This delta information is sent from the analyzer 2510 to the controller 2506.

The controller 2506, at 2538, converts the delta information into messages in a metadata artefact message format by sending a request to the analyzer 2510, which carries out the conversion at 2540 and returns results to the controller. The metadata artefact message format can describe operations to make one metadata artefact consistent with another. Or, the metadata artefact message format can simply summarize differences between two (or more) metadata artefacts. The controller 2506 can return the metadata artefact messages to the test framework adapter 2504 at 2542, which can convert the metadata artefact messages into a format used by a test framework at 2544.

Figure 26:
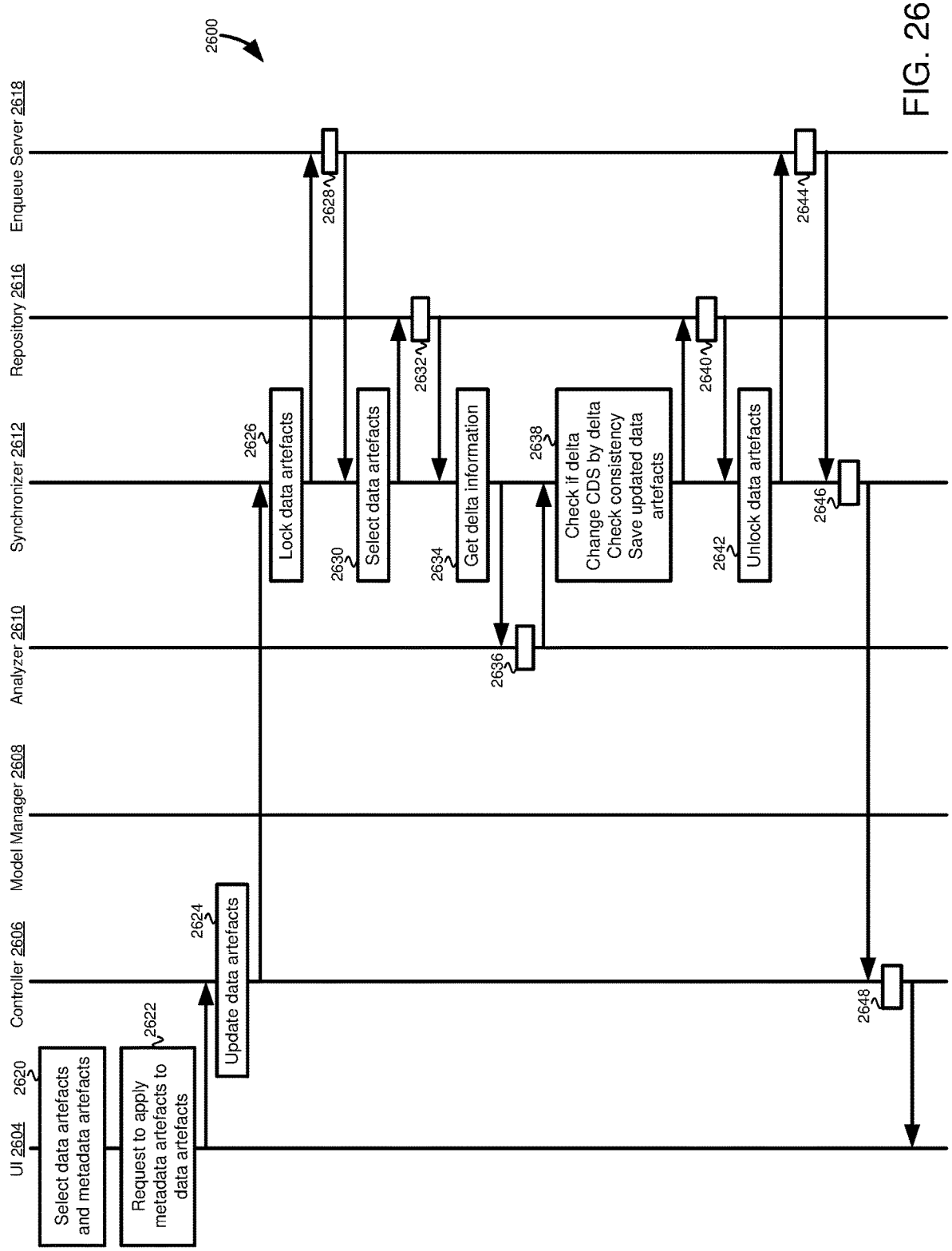
FIG. 26 is a timing diagram of a process for applying a metadata artefact to a data artefact.

FIG. 26 is a timing diagram of a process 2600 for applying one or more metadata artefacts to one or more data artefacts. The process 2600 is shown as implemented by a user interface 2604, a controller 2606, a model manager 2608, an analyzer 2610, a synchronizer 2612, a repository 2616, and an enqueue server 2618. The components 2606, 2608, 2610, 2612, 2616, 2618 can be implemented as described for the corresponding components 2506, 2508, 2510, 2512, 2516, and 2518 of FIG. 25. The user interface component 2604 can be the user interface component 2204 of FIG. 22.

At 2620, a user can use the user interface 2604 to select one or more metadata artefacts to apply to one or more data artefacts. The selection process can occur as described for the process 2300 of FIG. 23. A request to apply the metadata data artefacts to the data artefacts is received by the user interface 2604 at 2622 and is sent to the controller 2606. At 2624, the controller 2606 begins a process to update the data artefacts as requested. The controller 2606 sends a command to the synchronizer 2612 to synchronize the selected data artefacts with the relevant metadata artefacts. At 2626, the synchronizer 2612 sends a command to the enqueue server 2618 to lock the relevant data artefacts. The enqueue server 2618 locks the data artefacts at 2628.

At 2630, the synchronizer 2612 selects the data artefacts 2630 from the repository 2616. The synchronizer 2612, at 2634, gets delta information 2636 to determine if/how data artefacts should be updated as compared with the metadata artefacts to be applied to them. The delta information process can be carried out using the process 2500 of FIG. 25. At 2638, the synchronizer 2612 checks if any delta is detected, which would indicate that one or more data artefacts should be updated. Any such data artefacts can then be updated by the synchronizer 2612 at 2640. The technical consistency of changed data artefacts is previously checked by the synchronizer 2612 at 2638. At 2642, the synchronizer 2612 instructs the enqueue server 2618 to unlock the data artefacts, which the enqueue server does as 2644. The results of the update request are returned by the synchronizer 2612 to the controller 2606 at 2646, and by the controller to the user interface 2604 at 2648.

Figure 27:
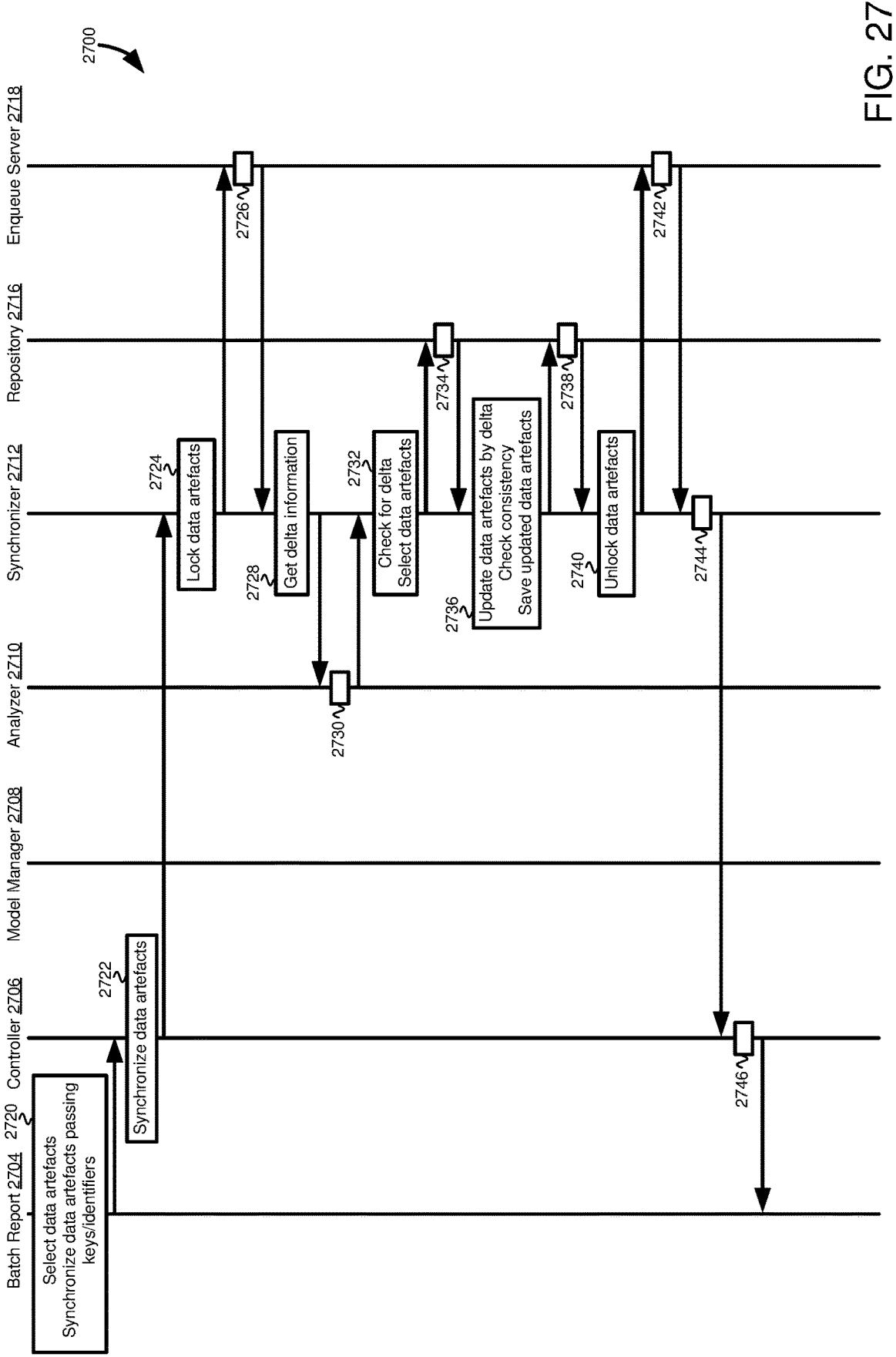
FIG. 27 is a timing diagram of a process for synchronizing data artefacts.

FIG. 27 is a timing diagram of a process 2700 of synchronizing data artefacts, which can include determining whether any changes are needed and, if so, carrying out such changes. The process 2700 is shown as implemented by a batch report 2704, a controller 2706, a model manager 2708, an analyzer 2710, a synchronizer 2712, a repository 2716, and an enqueue server 2718. The components 2706, 2708, 2710, 2712, 2716, 2718 can be implemented as described for the corresponding components 2506, 2508, 2510, 2512, 2516, and 2518 of FIG. 25. The batch report 2704 can correspond to the batch report component 2116 of FIG. 21.

At 2720, execution of a batch report by the batch report component 2704 selects data objects to be synchronized. The selection process can occur as described for the process 2300 of FIG. 23. A request to synchronize the data artefacts (e.g., make sure they are up to date) is sent at 2720 to the controller 2706. At 2722, the controller 2706 begins a process to synchronize the data artefacts as requested. The controller 2706 sends a command to the synchronizer 2712 to synchronize the selected data artefacts with the relevant metadata artefacts. At 2724, the synchronizer 2712 sends a command to the enqueue server 2718 to lock the relevant data artefacts. The enqueue server 2718 locks the data artefacts at 2726.

The synchronizer 2712, at 2728, gets delta information 2730 to determine if/how data artefacts should be updated as compared with the metadata artefacts to be applied to them. In some cases, this determination can be made using a summary of the metadata artefacts and metadata artefacts, including using the schema described in U.S. patent application Ser. No. 16/387,983. The delta information process can be carried out using the process 2500 of FIG. 25.

At 2732, the synchronizer 2712 checks if any delta is detected, which would indicate that one or more data artefacts should be updated. Any such data artefacts 2734 can then be selected from the repository 2716 by the synchronizer 2712 at 2732. The synchronizer 2712 performs updates on the data artefacts at 2736, as specified in the delta information. The technical consistency of changed data artefacts is also checked by the synchronizer 2712 at 2736. The synchronizer 2712 saves the updated data artefacts 2738 to the repository 2716 at 2736. At 2740, the synchronizer 2712 instructs the enqueue server 2718 to unlock the data artefacts, which is carried out by the enqueue server at 2742. The results of the update request are returned by the synchronizer 2712 to the controller 2706 at 2744, and by the controller to the batch report component 2704 at 2746.

Example 20—Example Selection Persistency Model

FIGS. 28A and 28B illustrates a persistency model that can be used to store representations of selection criteria, such as selection criteria defined using the process 2300 of FIG. 23. With reference to FIG. 28A, a table 2802 stores information regarding selections, where each record 2804 of the table 2802 can represent a particular selection.

The table 2804 includes a selection identifier attribute 2806, which can uniquely identify a particular selection. In some cases, the selection identifier attribute 2806 can be a primary key (which can be a technical key) for the table 2804, can be a technical key (e.g., an artificially assigned value, such as an integer). A description attribute 2808 can provide a semantic (e.g., human understandable) description of a given selection, such as describing the selection criteria. An object type attribute 2810 can provide a type for the selection, such as indicating that the selection is associated with an object in a data dictionary (and thus may be associated with a DDLS statement, or otherwise being a DDLS object), or that the selected artefacts have the indicated type. Attributes 2812, 2814, 2816, 2818 can describe, respectively, an identifier for a user or process that created a given selection, a date the selection was created, an identifier for a user or process that last changed a given selection, and a date that the selection was last changed.

A table 2820 can have records 2822 that correspond to particular selection conditions that are included in a selection of the table 2802. The table 2820 includes a selection identifier attribute 2824, which can correspond to the attribute 2806. Note that a given selection can be associated with multiple records 2822, and thus selection conditions, in the table 2820. The table 2820 can include a selection condition number attribute 2826, which can be used to distinguish between selection conditions when a given selection is associated with multiple records 2822. Although not shown, in other implementations, the table 2820 can assign a unique identifier (e.g., using a technical primary key) to each record 2822.

A criterion attribute 2828 lists particular selection criterion for a given selection condition of the table 2820. The value of the attribute 2828 can include metadata associated with a metadata artefact or data artefact, such as an application component with which the artefact is associated, a release status, or an object name. The values of the attribute 2828 can also include particular components of a data artefact or metadata artefact, such as specifying a particular annotation, data type, element, parameter, etc. A sign attribute 2830 can specify whether responsive artefacts are those that do or not satisfy the criterion attribute 2828.

An option attribute 2832 can specify an operator to apply to values for the criterion attribute 2828, such as whether responsive artefacts are those having values that are equal to a given value, are greater than or less than a given value, or contain all or part of a given value (e.g., using fuzzy search logic, pattern matching, substrings, etc.). When a single value is associated with a given option attribute 2832, the value can be specified in a low value attribute 2834, which can also supply the lower boundary for range-based criteria. In the event range based criteria are used, an upper bound van be specified for a high value attribute 2836.

A table 2840 can be used to define selection groups, where a selection group allows a selection of the table 2804 to be defined with respect to other selections. The table 2840 includes a selection identifier attribute 2842, which can be the selection identifier attribute 2806. An ordinal number attribute 2844 can be used to distinguish between different selections that may be used to define another selection, and in some cases can also be used to indicate an order in which selections should be applied in defining a given selection. An including operator attribute 2846 can indicate whether a given selection should or should not include results for a specified selection. The referenced, or specified, selection can be provided in an included selection identifier attribute 2848. Note that, in the example shown, selection IDs 4711 and 4712 of table 2804 are defined in the table 2820. However, selection identifier 4713 is defined in table 2840 based on selections IDs 4711, 4712. A given selection can be defined with respect to other selections (e.g., using table 2840) in addition to additional selection conditions defined for that given selection in the table 2820.

FIG. 28B illustrates a table 2850 that can be used to store object or artefact lists—lists of specific artefacts meeting selection criteria rather than (or in addition to) storing the selection criteria itself. A selection can thus be similar to a query, and an artefact list can be similar to a materialized view. The table 2850 is generally similar to the table 2820, and includes attributes 2852, 2854, 2856, 2858, 2860, 2862, 2864, which can be at least generally similar to the attributes 2824-2836. The table 2850 is shown as having records 2870 that correspond to a specific metadata artefact or data artefact (identified in the field 2862). A given selection ID, in this case 4712, can be associated with multiple records 2870, and thus multiple artefacts. Storing artefact lists, as in table 2850 can be useful, as it may be desirable to have a fixed list of artefacts that does not change over time, even if new artefacts are created that might satisfy the original selection criteria, or if existing artefacts are changed such that may no longer satisfy the selection criteria.

FIG. 28B also illustrates example selection criteria 2880 that can be produced from the tables 2804, 2820, 2840. Specifically, the selection criteria 2880 represents an executable selection for selection 4713 of table 2840. In at least some implementations, when a single criterion includes multiple conditions, the conditions are separate by a logical OR operation. Conditions for different criteria are typically separated by a logical AND operation. Operators such as AND, OR, and NOT can be used within groups of nested selections.

Example 21—Example Implementations

Figure 29:
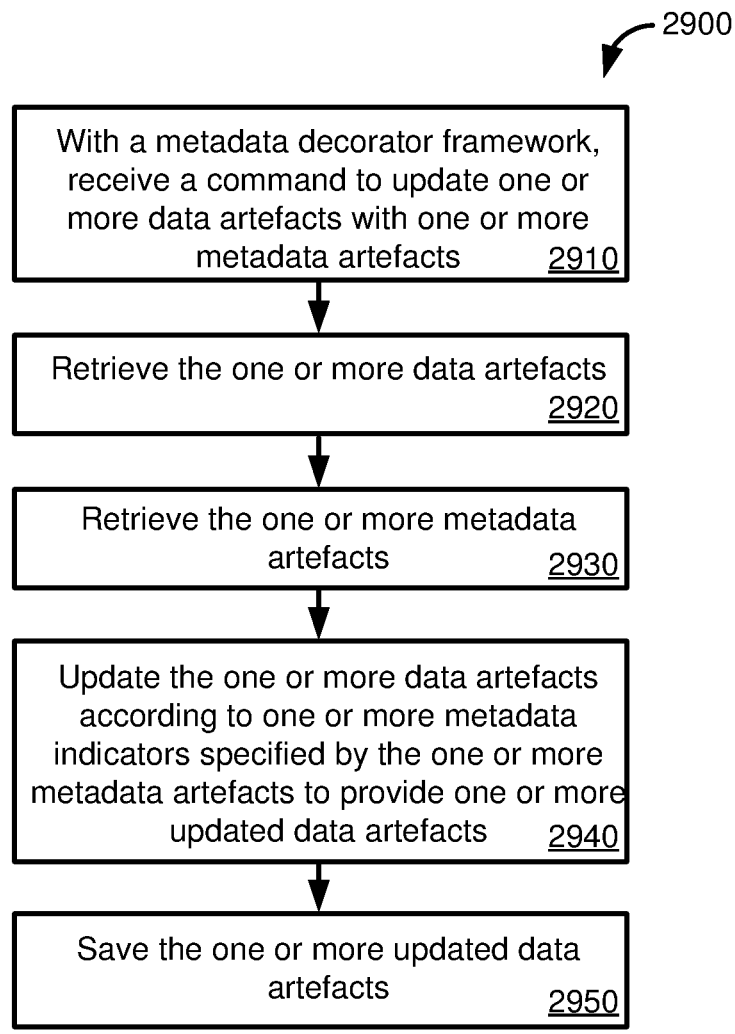
FIG. 29 is a flowchart of an example method of updating one or more data artefacts with one or more metadata artefacts.

FIG. 29 is a flowchart of an example method 2900 for updating one or more data artefacts using one or more metadata artefacts. The method 2900 can be implemented using the computing environment 100 of FIG. 1, including a computing environment that includes a metadata decorator framework as implemented in the metadata decorator framework 2100 of FIG. 21.

At 2910, a command is received by a metadata decorator framework to update one or more data artefacts with one or more metadata artefacts. A given metadata artefact of the one or more metadata artefacts includes one or more syntax elements processable by the metadata decorator framework. The one or more data artefacts are retrieved at 2920. The one or more metadata artefacts are retrieved at 2930. At 2940, the one or more data artefacts are updated according to one or more metadata indicators (such as annotations readable by a metadata decorator framework) specified by the one or more metadata artefacts to provide one or more updated data artefacts. A metadata indicator includes at least a portion of the one or more syntax elements. The one or more updated data artefacts are stored at 2950.

Example 22—Computing Systems

Figure 30:
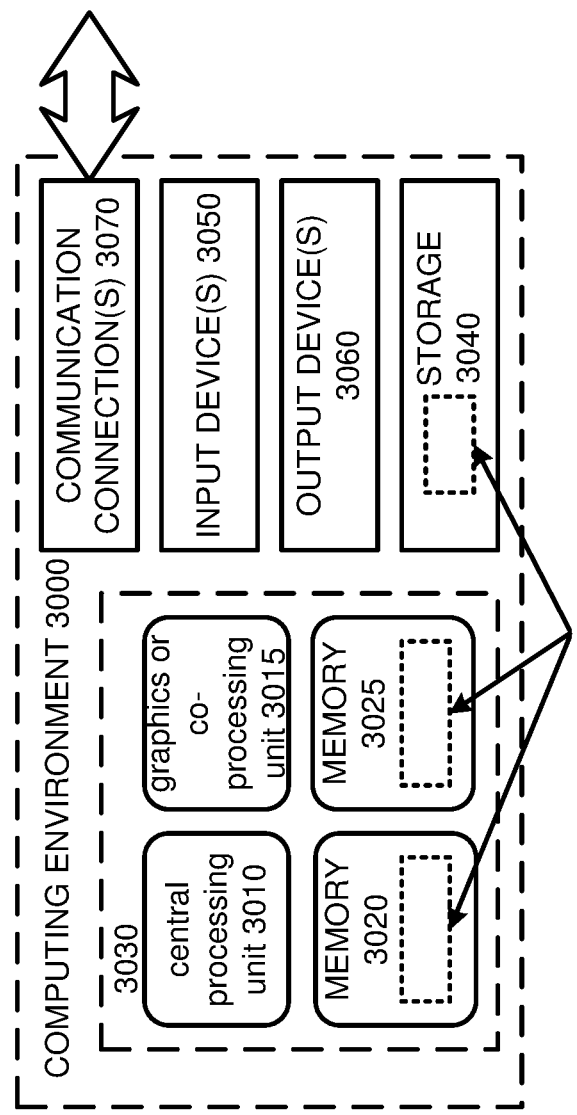
FIG. 30 is a diagram of an example computing system in which some described embodiments can be implemented.

FIG. 30 depicts a generalized example of a suitable computing system 3000 in which the described innovations may be implemented. The computing system 3000 is not intended to suggest any limitation as to scope of use or functionality of the present disclosure, as the innovations may be implemented in diverse general-purpose or special-purpose computing systems.

With reference to FIG. 30, the computing system 3000 includes one or more processing units 3010, 3015 and memory 3020, 3025. In FIG. 30, this basic configuration 3030 is included within a dashed line. The processing units 3010, 3015 execute computer-executable instructions, such as for implementing components of the environment 100 of FIG. 1, including as described in Examples 1-21. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 30 shows a central processing unit 3010 as well as a graphics processing unit or co-processing unit 3015. The tangible memory 3020, 3025 may be volatile memory (e.g., registers, cache, RAM), non-volatile memory (e.g., ROM, EEPROM, flash memory, etc.), or some combination of the two, accessible by the processing unit(s) 3010, 3015. The memory 3020, 3025 stores software 3080 implementing one or more innovations described herein, in the form of computer-executable instructions suitable for execution by the processing unit(s) 3010, 3015.

A computing system 3000 may have additional features. For example, the computing system 3000 includes storage 3040, one or more input devices 3050, one or more output devices 3060, and one or more communication connections 3070. An interconnection mechanism (not shown) such as a bus, controller, or network interconnects the components of the computing system 3000. Typically, operating system software (not shown) provides an operating environment for other software executing in the computing system 3000, and coordinates activities of the components of the computing system 3000.

The tangible storage 3040 may be removable or non-removable, and includes magnetic disks, magnetic tapes or cassettes, CD-ROMs, DVDs, or any other medium which can be used to store information in a non-transitory way and which can be accessed within the computing system 3000. The storage 3040 stores instructions for the software 3080 implementing one or more innovations described herein.

The input device(s) 3050 may be a touch input device such as a keyboard, mouse, pen, or trackball, a voice input device, a scanning device, or another device that provides input to the computing system 3000. The output device(s) 3060 may be a display, printer, speaker, CD-writer, or another device that provides output from the computing system 3000.

The communication connection(s) 3070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 23—Cloud Computing Environment

Figure 31:
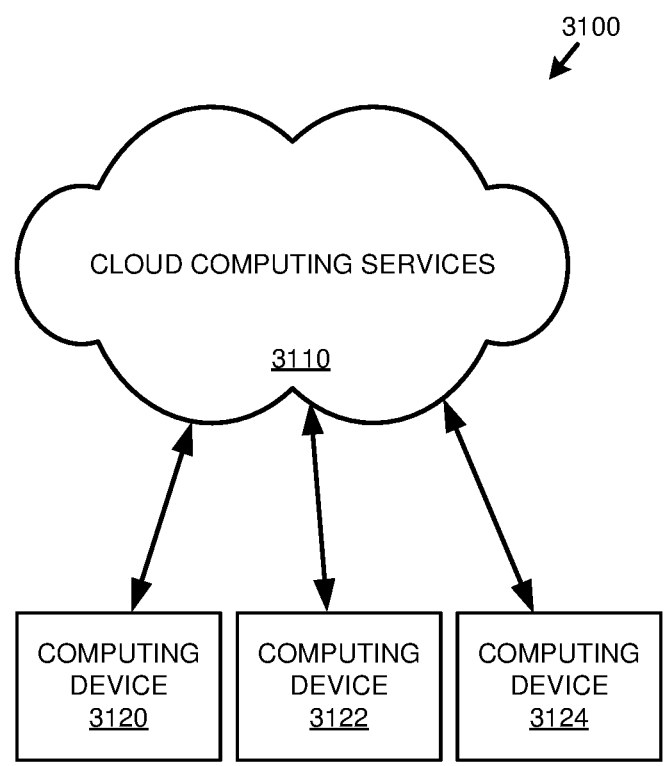
FIG. 31 is an example cloud computing environment that can be used in conjunction with the technologies described herein.

FIG. 31 depicts an example cloud computing environment 3100 in which the described technologies can be implemented. The cloud computing environment 3100 comprises cloud computing services 3110. The cloud computing services 3110 can comprise various types of cloud computing resources, such as computer servers, data storage repositories, networking resources, etc. The cloud computing services 3110 can be centrally located (e.g., provided by a data center of a business or organization) or distributed (e.g., provided by various computing resources located at different locations, such as different data centers and/or located in different cities or countries).

The cloud computing services 3110 are utilized by various types of computing devices (e.g., client computing devices), such as computing devices 3120, 3122, and 3124. For example, the computing devices (e.g., 3120, 3122, and 3124) can be computers (e.g., desktop or laptop computers), mobile devices (e.g., tablet computers or smart phones), or other types of computing devices. For example, the computing devices (e.g., 3120, 3122, and 3124) can utilize the cloud computing services 3110 to perform computing operators (e.g., data processing, data storage, and the like).

Example 24—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 30, computer-readable storage media include memory 3020 and 3025, and storage 3040. The term computer-readable storage media does not include signals and carrier waves. In addition, the term computer-readable storage media does not include communication connections (e.g., 3070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C #, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
    memory;
    one or more hardware processing units coupled to the memory; and
    one or more computer readable storage media storing instructions that, when executed, cause the computing system to perform operations comprising:
        with a metadata decorator framework, receiving a command to update one or more data artefacts with one or more metadata artefacts, wherein a given metadata artefact of the one or more metadata artefacts comprises one or more syntax elements processable by the metadata decorator framework;
        retrieving the one or more data artefacts;
        retrieving the one or more metadata artefacts;
        updating the one or more data artefacts according to one or more metadata indicators specified by the one or more metadata artefacts, the one or more metadata indicators comprising at least a portion of the one or more syntax elements, to provide one or more updated data artefacts; and
        saving the one or more updated data artefacts.

2. The computing system of claim 1, wherein a metadata indicator of the one or more metadata indicators is an annotation comprising a scope and an operation type.

3. The computing system of claim 2, wherein the scope is selected from an element, a field, a parameter, an association, a data type, a role, an entity, or an annotation.

4. The computing system of claim 2, wherein the operation type is selected from include, exclude, replace, or synchronize.

5. The computing system of claim 1, the operations further comprising:
    receiving selection criteria; and
    persisting the selection criteria in a data model.

6. The computing system of claim 1, the operations further comprising:
    receiving selection criteria;
    selecting at least one of the one or more data artefacts or at least one of the one or more metadata data artefacts responsive to the selection criteria; and
    persisting information regarding responsive data artefacts or metadata artefacts in a data model.

7. The computing system of claim 1, the operations further comprising:
    checking consistency of the one or more updated data artefacts.

8. The computing system of claim 1, the operations further comprising:
    determining that a first metadata artefact of the one or more metadata artefacts comprises a metadata indicator incorporating one or more additional metadata artefacts; and
    logically merging the first metadata artefact and the one or more additional metadata artefacts to provide a merged metadata artefact; and
    wherein the merged metadata artefact is used during the updating.

9. The computing system of claim 1, the operations further comprising:
    for first metadata artefact of the one or more metadata artefacts comprising a first component type and a second component type, determining a scope associated with a metadata indicator of the one or more metadata indicators;
    determining that the second component type is not within the scope of the metadata indicator; and
    not updating data artefacts of the one or more data artefacts with the second component type.

10. The computing system of claim 1, wherein the one or more data artefacts are artefacts of a virtual data model.

11. The computing system of claim 10, wherein at least a first data artefact of the one or more data artefacts is a definition of a view in the virtual data model.

12. The computing system of claim 1, wherein data artefacts and metadata artefacts are implemented in a common schema notation.

13. The computing system of claim 1, wherein at least one metadata artefact of the one or more metadata artefacts is also a data artefact.

14. The computing system of claim 13, wherein the at least one metadata artefact does not include an identifier identifying the at least one metadata artefact as a metadata artefact.

15. The computing system of claim 1, wherein at least one metadata artefact of the one or more metadata artefacts comprises a mapping, the mapping associating a local component name for the at least one metadata artefact with one or more aliases used by at least one data artefact of the one or more data artefacts.

16. The computing system of claim 1, the operations further comprising:
    prior to saving at least one updated data artefact of the one or more updated data artefacts, annotating the at least one updated data artefact to reflect the updating.

17. The computing system of claim 1, wherein multiple metadata artefacts of the one or more metadata artefacts are used to update at least one data artefact of the one or more data artefacts.

18. The computing system of claim 1, wherein at least one metadata artefact of the one or more metadata artefacts comprises a metadata indicator indicating at least one of an indicator that the at least one metadata artefact cannot be used by certain processes, an indicator that the at least one metadata artefact cannot be changed, an indicator of components of the at least one metadata artefact that can be changed, or at least one value of the at least one metadata artefact that can be changed.

19. The computing system of claim 1, wherein the updated data artefacts are saved to, or the data artefacts or metadata artefacts are retrieved from, a persistency layer.

20. A method, implemented in a computing system comprising a memory and one or more hardware processors, comprising:
with a metadata decorator framework, receiving a command to update one or more data artefacts with one or more metadata artefacts, wherein a given metadata artefact of the one or more metadata artefacts comprises one or more syntax elements processable by the metadata decorator framework;
retrieving the one or more data artefacts;
retrieving the one or more metadata artefacts;
updating the one or more data artefacts according to one or more annotations specified by the one or more metadata artefacts, the one or more annotations comprising at least a portion of the one or more syntax elements, to provide one or more updated data artefacts; and
saving the one or more updated data artefacts.

21. One or more computer-readable storage media comprising:
computer-executable instructions that, when executed by a computing system comprising at least one hardware processor and at least one memory coupled to the at least one hardware processor, cause the computing system to, with a metadata decorator framework, receive a command to update one or more data artefacts with one or more metadata artefacts, wherein a given metadata artefact of the or more metadata artefacts comprises one or more syntax elements processable by the metadata decorator framework;
computer-executable instructions that, when executed by the computing system, cause the computing system to retrieve the one or more data artefacts;
computer-executable instructions that, when executed by the computing system, cause the computing system to retrieve the one or more metadata artefacts;
computer-executable instructions that, when executed by the computing system, cause the computing system to update the one or more data artefacts according to one or more annotations specified by the one or more metadata artefacts, the one or more annotations comprising at least a portion of the one or more syntax elements, to provide one or more updated data artefacts; and
computer-executable instructions that, when executed by the computing system, cause the computing system to save the one or more updated data artefacts.

* * * * *